United States Patent

Sasai

(10) Patent No.: US 8,817,131 B2
(45) Date of Patent: Aug. 26, 2014

(54) INFORMATION RECORDING APPARATUS, IMAGE CAPTURING APPARATUS, AND INFORMATION RECORDING METHOD FOR CONTROLLING RECORDING OF LOCATION INFORMATION IN GENERATED IMAGES

(75) Inventor: Takashi Sasai, Chiba (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 12/936,926

(22) PCT Filed: Mar. 19, 2009

(86) PCT No.: PCT/JP2009/055511
§ 371 (c)(1),
(2), (4) Date: Oct. 8, 2010

(87) PCT Pub. No.: WO2009/133729
PCT Pub. Date: Nov. 5, 2009

(65) Prior Publication Data
US 2011/0043658 A1     Feb. 24, 2011

(51) Int. Cl.
*H04N 5/76* (2006.01)

(52) U.S. Cl.
USPC .................................. 348/231.3; 348/231.5

(58) Field of Classification Search
USPC ............... 348/231.3–231.6, 11.1–211.14; 455/456.1–456.6; 725/105
See application file for complete search history.

(56) References Cited

U.S. PATENT DOCUMENTS

| 2003/0235399 A1 | 12/2003 | Kawahara |
| 2008/0094499 A1 | 4/2008 | Ueno et al. |
| 2009/0033768 A1 | 2/2009 | Toyoda |
| 2009/0160970 A1* | 6/2009 | Fredlund et al. ............ 348/229.1 |
| 2010/0220213 A1 | 9/2010 | Ueno et al. |
| 2012/0078898 A1* | 3/2012 | Kononenko et al. .......... 707/736 |

FOREIGN PATENT DOCUMENTS

| JP | 2000 261704 | 9/2000 |
| JP | 2003 198918 | 7/2003 |
| JP | 2006 221369 | 8/2006 |
| JP | 2007 88754 | 4/2007 |
| JP | 2007 266928 | 10/2007 |
| JP | 2007-281799 | 10/2007 |
| WO | WO 2009019523 A2 * | 2/2009 |

OTHER PUBLICATIONS

International Search Report issued Jun. 23, 2009 in PCT/JP09/55511 filed Mar. 19, 2009.
Office Action issued on Jun. 14, 2011 in the corresponding Japanese Patent Application No. 2008-118140.
Extended European Search Report issued Apr. 6, 2011, in Patent Application No. 09738666.8.

* cited by examiner

*Primary Examiner* — Nelson D. Hernández Hernández
(74) *Attorney, Agent, or Firm* — Oblon, Spivak, McClelland, Maier & Neustadt, L.L.P.

(57) ABSTRACT

An information recording apparatus includes a content generating unit that generates content, a position information obtaining unit that obtains position information, and a region determining unit that determines whether or not a position specified based on the obtained position information is included in a certain region. The information recording apparatus further includes a position information addition determining unit that determines, based on a determination result obtained by the region determining unit, whether or not to allow the obtained position information to be recorded, and a recording control unit that performs, based on a determination result obtained by the position information addition determining unit, recording control of the obtained position information.

10 Claims, 18 Drawing Sheets

FIG. 10
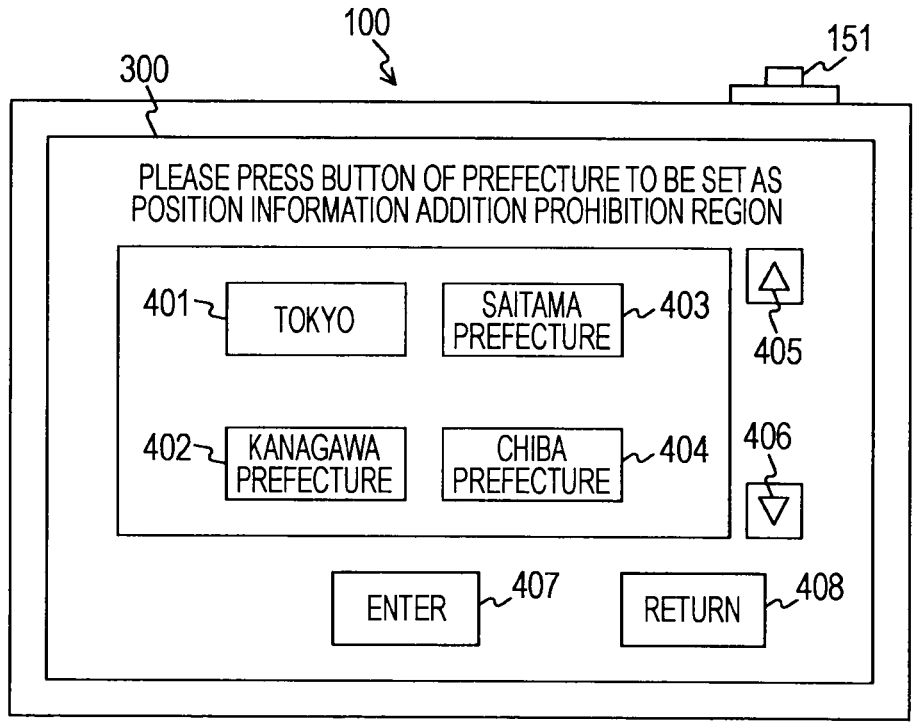
(a)
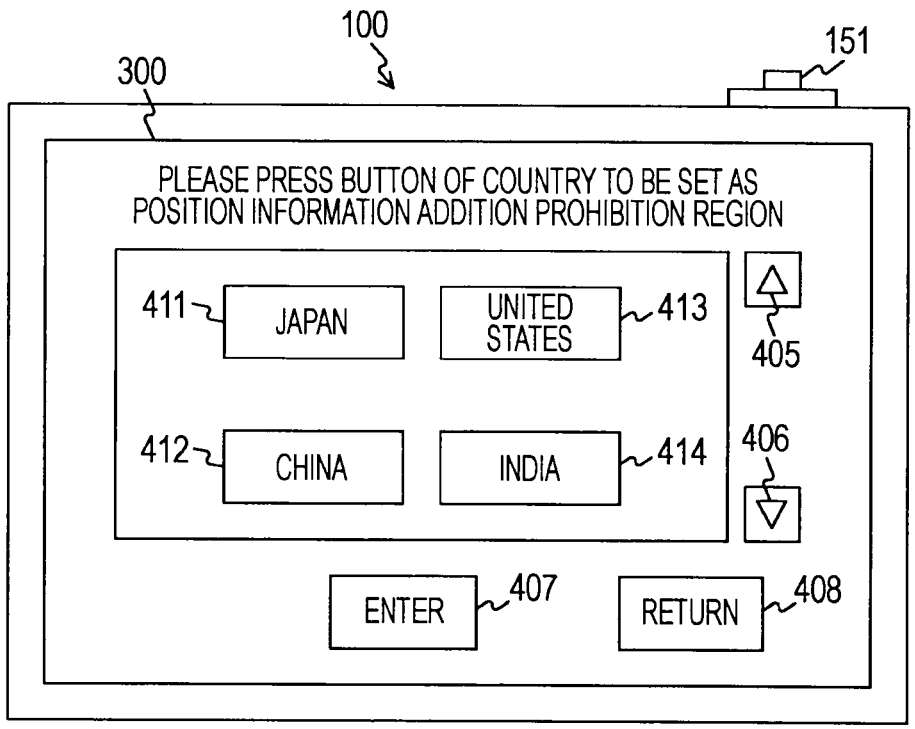
(b)

Figure 11:
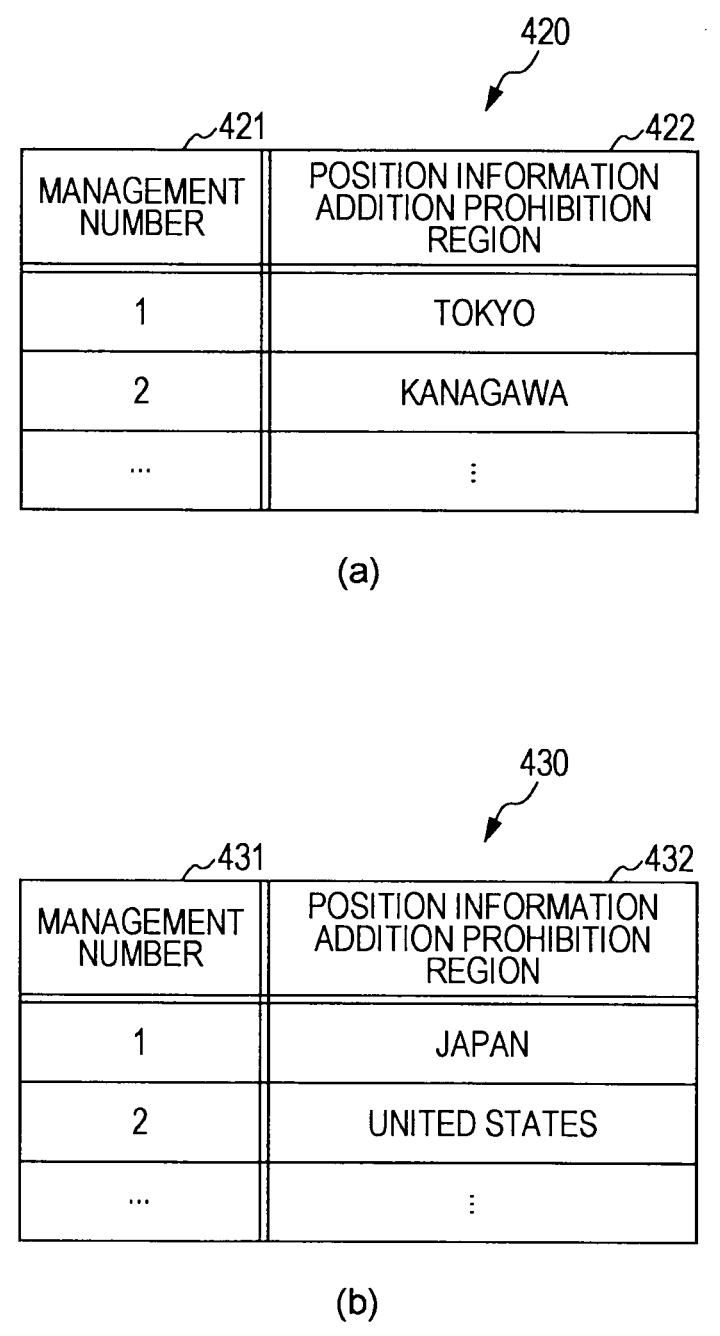

| MANAGEMENT NUMBER 421 | POSITION INFORMATION ADDITION PROHIBITION REGION 422 |
|---|---|
| 1 | TOKYO |
| 2 | KANAGAWA |
| ... | ⋮ |

(a)

430

| MANAGEMENT NUMBER 431 | POSITION INFORMATION ADDITION PROHIBITION REGION 432 |
|---|---|
| 1 | JAPAN |
| 2 | UNITED STATES |
| ... | ⋮ |

| MANAGEMENT NUMBER ~611 | FIRST IMAGE RECORDING PARAMETER ~612 | SECOND IMAGE RECORDING PARAMETER ~613 |
|---|---|---|
| 1 | RAW | JPEG |
| 2 | DESIGNATED NUMBER OF PIXELS | VGA |
| ⋮ | ⋮ | ⋮ |

(b)

| MANAGEMENT NUMBER ~621 | RECORDING PARAMETER ~622 | POSITION INFORMATION ADDITION WITHIN PROHIBITION REGION ~623 |
|---|---|---|
| 1 | RAW | YES |
| 2 | DESIGNATED NUMBER OF PIXELS | YES |
| 3 | JPEG | NO |
| 4 | VGA | NO |
| ⋮ | ⋮ | ⋮ |

INFORMATION RECORDING APPARATUS, IMAGE CAPTURING APPARATUS, AND INFORMATION RECORDING METHOD FOR CONTROLLING RECORDING OF LOCATION INFORMATION IN GENERATED IMAGES

TECHNICAL FIELD

The present invention relates to an information recording apparatus, and more particularly, to an information recording apparatus and an image capturing apparatus capable of recording position information in association with content, an information recording method in these apparatuses, and a program that causes a computer to execute the method.

BACKGROUND ART

Hitherto, image capturing apparatuses such as digital still cameras that capture images of photographic subjects such as people and record the captured images exist as information recording apparatuses that record content. Also, with the use of a network such as the Internet and recording media, transfer of the captured images recorded by the image capturing apparatuses to people other than those who have captured the images has been widely done. Further, making the captured images recorded by the image capturing apparatuses public by utilizing Web sites on the Internet or the like has also been widely done.

Also, in recent years, a digital still camera that obtains position information using GPS (Global Positioning System), adds the position information to a captured image, and records the captured image has been proposed (for example, see Japanese Unexamined Patent Application Publication No. 2000-261704 (FIG. 1)). When position information is added to a captured image in this manner, a user who has obtained this captured image can be informed of the place where the image capturing of the captured image has been done.

For example, in the case where image capturing is done at a user's home using the above-described conventional art, personal information such as the address of the user's home may be added as position information to a captured image. Here, personal information such as the home address is information that is undesired to be revealed to people other than the user's acquaintances. However, in the case where a captured image to which personal information is added as position information is made public by utilizing a Web site or the like, the position information added to the captured image becomes accessible to third persons.

Therefore, a content data processing apparatus that sends, when sending an image file to which personal information that is undesired to be revealed to other people is added, the image file after removing the personal information with a user operation has been proposed (for example, see Japanese Unexamined Patent Application Publication No. 2007-88754 (FIG. 1)).

According to the above-described conventional art, for example, in the case where a captured image to which position information that is undesired to be revealed to other people is added is to be made public by utilizing a Web site or the like, the position information can be removed with a user operation, and then the captured image can be made public. Therefore, the position information added to the captured image is prevented from being revealed to other people.

However, with the above-described conventional art, every time the user sends a captured image, it is necessary for the user to individually determine whether or not to delete position information added to the captured image and to perform a deletion operation. Therefore, there is a problem that a determination involved in determining whether or not to perform deletion, and a deletion operation are bothersome. Also, in the case where the user forgets to perform a deletion operation when sending a captured image, the captured image to which position information that is undesired to be revealed to people other than the user's acquaintances may be made public.

To this end, it is an object of the present invention to prevent position information regarding personal information from being revealed to other people when content is utilized.

DISCLOSURE OF INVENTION

The present invention is made to solve the above-described problem, and a first aspect thereof resides in an information recording apparatus, an information recording method therein, and a program that causes a computer to execute the method. The information recording apparatus includes a content generating unit that generates content; a position information obtaining unit that obtains position information at the time the content is generated; a region determining unit that determines whether or not a position specified based on the obtained position information is included in a certain region; a position information addition determining unit that determines, based on a determination result obtained by the region determining unit, whether or not to allow the obtained position information to be recorded in association with the generated content at the time the generated content is to be recorded; and a recording control unit that performs, based on a determination result obtained by the position information addition determining unit, recording control of the obtained position information into the generated content. Accordingly, there is an operation that it is determined whether or not a position specified based on position information obtained at the time content is generated is included in a certain region; it is determined, based on a determination result thereof, whether or not to allow the position information to be recorded in association with the content at the time the content is to be recorded; and, based on a determination result thereof, recording control of the position information into the content is performed.

Also, in the first aspect, the information recording apparatus may further include a position information addition condition storage unit that stores a position information addition condition that determines whether or not to allow the obtained position information to be recorded in association with the generated content, in the case where the position specified based on the obtained position information is included in the certain region. The position information addition determining unit may determine whether or not to allow the obtained position information to be recorded in association with the generated content at the time the generated content is to be recorded, based on the determination result obtained by the region determining unit and the position information addition condition stored in the position information addition condition storage unit. Accordingly, there is an operation that it is determined whether or not to allow the position information to be recorded in association with the content at the time the content is to be recorded, based on the determination result obtained by the region determining unit and the position information addition condition.

Also, in the first aspect, the position information addition condition storage unit may store, as the position information addition condition, a plurality of recording parameters at the time the generated content is to be recorded. The information recording apparatus may further include an operation accepting unit that accepts a designation operation that designates at least one recording parameter from among the plurality of recording parameters stored in the position information addition condition storage unit. The position information addition determining unit may determine whether or not to allow the obtained position information to be recorded in association with the generated content at the time the generated content is to be recorded, based on the determination result obtained by the region determining unit and the designated recording parameter. The recording control unit may perform, based on a determination result obtained by the position information addition determining unit, recording control of the obtained position information into the generated content, and allow the generated content to be recorded in accordance with the designated recording parameter. Accordingly, there is an operation that it is determined whether or not to allow the position information to be recorded in association with the content at the time the content is to be recorded, based on the determination result obtained by the region determining unit and the designated recording parameter; based on a determination result thereof, recording control of the position information into the content is performed; and the content is recorded in accordance with the designated recording parameter.

Also, in the first aspect, the information recording apparatus may further include a recording parameter storage unit that stores a plurality of recording parameters at the time the generated content is to be recorded. The position information addition determining unit may determine, for each recording parameter, whether or not to allow the obtained position information to be recorded in association with the generated content at the time the generated content is to be recorded, based on the determination result obtained by the region determining unit and the plurality of recording parameters. The recording control unit may sequentially perform, for the plurality of recording parameters, recording control of the obtained position information into the generated content, based on a determination result obtained by the position information addition determining unit, and allow, for each recording parameter, the generated content to be sequentially recorded in accordance with the plurality of recording parameters. Accordingly, there is an operation that whether or not to allow the position information to be recorded in association with the content at the time the content is to be recorded is determined for each recording parameter, based on the determination result obtained by the region determining unit and the plurality of recording parameters; based on a determination result thereof, recording control of the position information into the content is sequentially performed for each recording parameter; and the content is sequentially recorded for each recording parameter in accordance with the plurality of recording parameters.

Also, in the first aspect, the recording parameter storage unit may store a plurality of combinations of recording parameters at the time the generated content is to be recorded. The information recording apparatus may further include an operation accepting unit that accepts a designation operation that designates at least one combination from among the plurality of combinations stored in the recording parameter storage unit. The position information addition determining unit may determine, for each of a plurality of recording parameters relating to the designated combination, whether or not to allow the obtained position information to be recorded in association with the generated content at the time the generated content is to be recorded, based on the determination result obtained by the region determining unit and the plurality of recording parameters relating to the designated combination. The recording control unit may sequentially perform, for each of the recording parameters relating to the designated combination, recording control of the obtained position information into the generated content, based on a determination result obtained by the position information addition determining unit, and allow, for each recording parameter, the generated content to be sequentially recorded in accordance with the plurality of recording parameters relating to the designated combination. Accordingly, there is an operation that, for each of a plurality of recording parameters relating to the designated combination, whether or not to allow the position information to be recorded in association with the content at the time the content is to be recorded is determined, based on the determination result obtained by the region determining unit and the plurality of recording parameters relating to the combination; based on a determination result thereof, recording control of the position information into the content is sequentially performed for each of the recording parameters relating to the combination; and the content is sequentially recorded for each recording parameter in accordance with the plurality of recording parameters relating to the combination.

Also, in the first aspect, the position information addition determining unit may determine to allow the generated content to be recorded without associating the obtained position information with the content, in the case where the position specified based on the obtained position information is included in the certain region, and determine to allow the content to be recorded while associating the obtained position information with the content, in the case where the position specified based on the obtained position information is not included in the certain region. Accordingly, there is an operation that it is determined not to associate the position information with the content, in the case where the position specified based on the obtained position information is included in the certain region, and it is determined to associate the position information with the content, in the case where the position specified based on the obtained position information is not included in the certain region.

Also, in the first aspect, the certain region may be a region including a position regarding personal information. Accordingly, there is an operation that it is determined whether or not the position specified based on the obtained position information at the time the content is generated is included in a region including a position regarding personal information.

Also, in the first aspect, the information recording apparatus may further include an operation accepting unit that accepts a designation operation that designates a region on a map as the certain region. Accordingly, there is an operation that a region on a map is designated as the certain region.

Also, a second aspect of the present invention resides in an image capturing apparatus, an information recording method therein, and a program that causes a computer to execute the method. The image capturing apparatus includes an image capturing unit that captures an image of a photographic subject and generates a captured image; a position information obtaining unit that obtains position information at the time the captured image is generated; a region determining unit that determines whether or not a position specified based on the obtained position information is included in a certain region; a position information addition determining unit that determines, based on a determination result obtained by the region determining unit, whether or not to allow the obtained position information to be recorded in association with the generated captured image at the time the generated captured image is to be recorded; and a recording control unit that performs, based on a determination result obtained by the position information addition determining unit, recording control of the obtained position information into the generated captured image. Accordingly, there is an operation that whether or not a position specified based on position information obtained at the time a captured image is generated is included in a certain region is determined; based on a determination result thereof, whether or not to allow the position information to be recorded in association with the captured image at the time the captured image is to be recorded is determined; and based on a determination result thereof, recording control of the position information into the captured image is performed.

According to the present invention, an excellent advantageous effect can be achieved that position information regarding personal information is prevented from being revealed to other people when content is utilized.

BRIEF DESCRIPTION OF DRAWINGS

FIG. 10 includes diagrams illustrating the overview of a setting method of setting a position information addition prohibiting region on the liquid crystal panel 300 according to the embodiment of the present invention.

FIG. 11 includes diagrams schematically illustrating details stored in position information addition prohibition region storage units 420 and 430 according to the embodiment of the present invention.

FIG. 16 includes diagrams schematically illustrating details stored in a recording parameter combination information storage unit 610 and a position information addition condition storage unit 620 according to the embodiment of the present invention.

BEST MODES FOR CARRYING OUT THE INVENTION

Next, embodiments of the present invention will now be described in detail with reference to the drawings.

Figure 1:
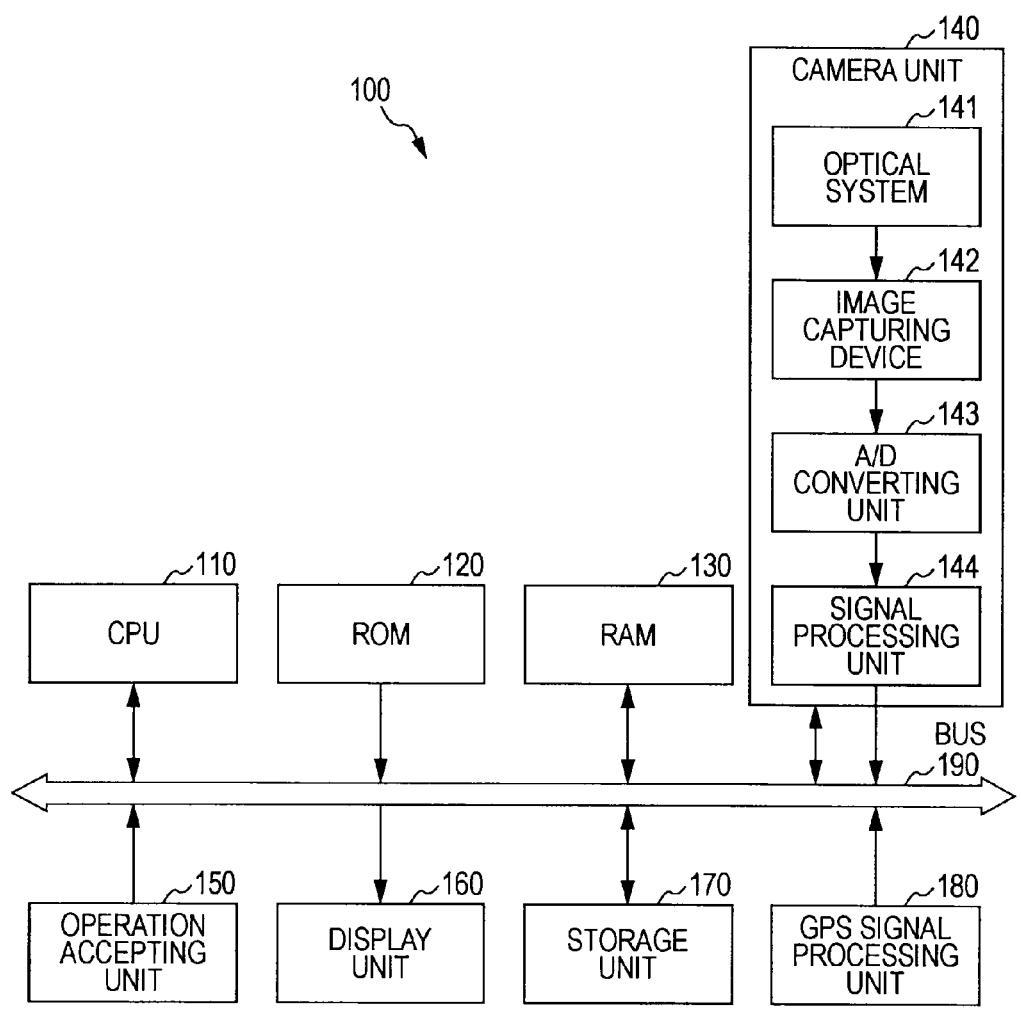
FIG. 1 is a block diagram illustrating an example of the internal configuration of an image capturing apparatus 100 according to an embodiment present information.

FIG. 1 is a block diagram illustrating an example of the internal configuration of an image capturing apparatus 100 according to an embodiment of the present invention. The image capturing apparatus 100 includes a CPU (Central Processing Unit) 110, a ROM (Read Only Memory) 120, a RAM (Random Access Memory) 130, a camera unit 140, an operation accepting unit 150, a display unit 160, a storage unit 170, a GPS (Global Positioning System) signal processing unit 180, and a bus 190. The image capturing apparatus 100 can be realized by, for example, a digital still camera capable of obtaining position information and recording the position information in association with a captured image.

The CPU 110 is configured to control each unit of the image capturing apparatus 100 based on various control programs stored in the ROM 120. Also, the CPU 110 controls each unit of the image capturing apparatus 100 based on an operation input or the like accepted by the operation accepting unit 150. Note that control performed by the CPU 110 will be described in detail with reference to FIG. 2.

The ROM 120 is a read-only memory and is configured to store various control programs and the like.

The RAM 130 is a memory used as a main memory (main storage device) of the CPU 110 and includes a work area or the like of a program executed by the CPU 110.

The camera unit 140 is configured to capture an image of a photographic subject and to generate a captured image.

The camera unit 140 includes an optical system 141, an image capturing device 142, an A/D (Analog/Digital) converting unit 143, and a signal processing unit 144.

The optical system 141 is constituted of a plurality of lenses (zoom lens, focus lens (not illustrated), and the like) that condense light from a photographic subject. Incident light from the photographic subject is supplied via these lenses and an iris (not illustrated) to the image capturing device 142.

The image capturing device 142 is configured to perform, based on control of the CPU 110, photoelectric conversion of an optical signal from a photographic subject that is entered via the optical system 141 into an analog image signal, and to output the analog image signal obtained by this photoelectric conversion to the A/D converting unit 143. An image capturing device such as a CCD (Charge Coupled Device) sensor or a CMOS (Complementary Metal Oxide Semiconductor) sensor can be used as the image capturing device 142.

The A/D converting unit 143 is configured to apply, based on control of the CPU 110, analog signal processing such as noise removal to the analog image signal supplied from the image capturing device 142 and to perform A/D conversion of the image signal which has been subjected to analog signal processing. Image data that is a digital signal obtained by this A/D conversion is supplied to the signal processing unit 144.

The signal processing unit 144 is configured to apply, based on control of the CPU 110, digital signal processing such as contour enhancement, gamma correction, and flicker removal to the image data supplied from the A/D converting unit 143. The image data which has been subjected to digital signal processing is supplied as a captured image to the display unit 160 or the like. Also, the captured image is stored in the storage unit 170.

The operation accepting unit 150 is an operation accepting unit that accepts operation details entered by a user, and the operation accepting unit 150 outputs a signal in accordance with the accepted operation details to the CPU 110. For example, in an image capturing mode that is a state where a captured image is recordable, an operation member such as a shutter button 151 (illustrated in FIG. 4 and the like) for starting a captured image recording operation is included in the image capturing apparatus 100. Here, the image capturing apparatus 100 can set a normal image capturing mode that is an image capturing mode where position information is not recorded in an image file, and a position information addition image capturing mode that is an image capturing mode where position information is recorded in an image file under a certain condition, in accordance with an operation input from the operation accepting unit 150. Note that, hereinafter, the case where the image capturing apparatus 100 is set to the position information addition image capturing mode will be described by way of example. Note that, in the embodiment of the present invention, an example where part of the operation accepting unit 150 and the display unit 160 are integrally constructed as a liquid crystal panel 300 (illustrated in FIG. 4 and the like) will be described. Here, the liquid crystal panel 300 is constructed with a touch panel that displays a selection button or the like that can select a region that a finger or the like touches.

The display unit 160 is a display unit that displays various items of information based on control of the CPU 110. For example, in an image capturing mode, captured images generated by the camera unit 140 are sequentially displayed on the display unit 160. A display such as an LCD (Liquid Crystal Display) can be used as the display unit 160.

The storage unit 170 is a storage unit that stores, based on control of the CPU 110, a captured image generated by the camera unit 140. Here, various items of data such as an image file in the JPEG (Joint Photographic Experts Group) format are recorded in the storage unit 170. Also, a recording medium such as a memory card, an optical disk, a magnetic disk, or a magnetic tape can be used as the storage unit 170. The recording medium may be included in the image capturing apparatus 100 or may be removably connected to the image capturing apparatus 100.

The GPS signal processing unit 180 is configured to compute position information based on a GPS signal received by a GPS signal receiving antenna (not illustrated), and the GPS signal processing unit 180 outputs the computed position information to the CPU 110. Note that the computed position information includes individual items of data regarding a position, such as the latitude, the longitude, and the altitude.

Figure 2:
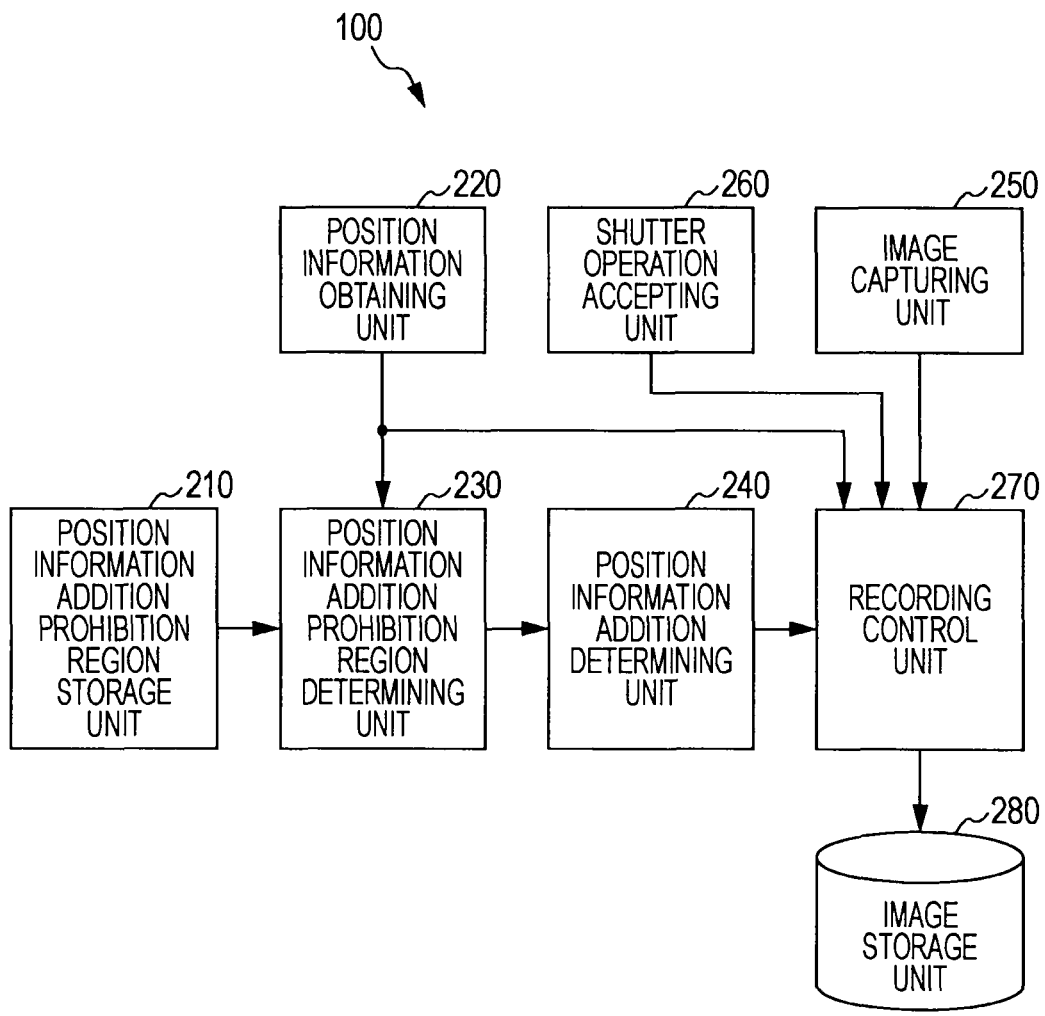
FIG. 2 is a block diagram illustrating an example of the functional configuration of the image capturing apparatus 100 according to the embodiment of the present invention.

FIG. 2 is a block diagram illustrating an example of the functional configuration of the image capturing apparatus 100 according to the embodiment of the present invention. The image capturing apparatus 100 includes a position information addition prohibition region storage unit 210, a position information obtaining unit 220, a position information addition prohibition region determining unit 230, a position information addition determining unit 240, an image capturing unit 250, a shutter operation accepting unit 260, a recording control unit 270, and an image storage unit 280.

The position information addition prohibition region storage unit 210 is configured to store a position information addition prohibition region set by a user, and supplies the stored position information addition prohibition region to the position information addition prohibition region determining unit 230. Here, a position information addition prohibition region is a region regarding an individual's privacy or personal information and is a region including a position (address, name of a place, etc.) that is undesired to be revealed to people other than the user's acquaintances. For example, regions including a home, an office, a commuting route, a child's school such as a nursery school, a kindergarten, an elementary school, a junior high school, a high school, or a college, a partner's house, and a parents' house may be mentioned as position information addition prohibition regions. Also, position information is information that includes indirect data generated based on information or a position for specifying a position such as an address or the name of a place. Note that the position information addition prohibition region storage unit 210 corresponds to the RAM 130 illustrated in FIG. 1. Also, details stored in the position information addition prohibition region storage unit 210 will be described in detail with reference to FIG. 3.

The position information obtaining unit 220 is configured to compute position information based on a GPS signal, and the position information obtaining unit 220 supplies the computed position information to the position information addition prohibition region determining unit 230. Note that the position information obtaining unit 220 corresponds to the GPS signal processing unit 180 illustrated in FIG. 1.

The position information addition prohibition region determining unit 230 is configured to determine whether or not a position specified based on position information output from the position information obtaining unit 220 is included in at least one of position information addition prohibition regions stored in the position information addition prohibition region storage unit 210. The position information addition prohibition region determining unit 230 sequentially outputs a determination result to the position information addition determining unit 240. Note that the position information addition prohibition region determining unit 230 corresponds to the CPU 110 illustrated in FIG. 1. Also, the position information addition prohibition region determining unit 230 is an example of a region determining unit described in claims.

The position information addition determining unit 240 is configured to determine, based on the determination result output from the position information addition prohibition region determining unit 230, whether or not to record position information output from the position information obtaining unit 220 in association with a captured image generated by the image capturing unit 250. The position information addition determining unit 240 sequentially outputs a determination result to the recording control unit 270. Specifically, in the case where a position (current position) specified based on position information output from the position information obtaining unit 220 is included in none of position information addition prohibition regions stored in the position information addition prohibition region storage unit 210, it is determined to record a captured image in association with the position information. In contrast, in the case where the current position is included in any of the position information addition prohibition regions, it is determined to record a captured image without associating the position information. Note that the position information addition determining unit 240 corresponds to the CPU 110 illustrated in FIG. 1.

The image capturing unit 250 is configured to convert incident light from a photographic subject in accordance with a certain image capturing parameter and to generate a captured image, and the image capturing unit 250 outputs the generated captured image to the recording control unit 270. Note that the image capturing unit 250 corresponds to the camera unit 140 illustrated in FIG. 1. Also, the image capturing unit 250 is an example of a content generating unit and an image capturing unit described in claims.

The shutter operation accepting unit 260 is an operation accepting unit that accepts a shutter operation performed by a user and outputs a captured image recording instruction to the recording control unit 270. That is, in the case where the shutter button 151 (illustrated in FIG. 4 and the like) for recording a still image is pressed, a captured image generated by the image capturing unit 250 upon this pressing is recorded as an image file in the image storage unit 280. Note that the shutter operation accepting unit 260 corresponds to the operation accepting unit 150 illustrated in FIG. 1.

The recording control unit 270 is configured to perform, when a recording instruction is output from the shutter operation accepting unit 260, control to generate an image file of a captured image output from the image capturing unit 250 and to record the image file in the image storage unit 280. Also, at the time an image file is to be generated, the recording control unit 270 performs control as to whether or not to record position information output from the position information obtaining unit 220 in the image file, based on a determination result output from the position information addition determining unit 240. Specifically, in the case where a determination result output from the position information addition determining unit 240 is a determination result indicating that the captured image is to be recorded in association with the position information, the position information is recorded in the image file of the captured image. In contrast, in the case where a determination result output from the position information addition determining unit 240 is a determination result indicating that the captured image is to be recorded without being associated with the position information, the position information is not recorded in the image file of the captured image. Note that the recording control unit 270 corresponds to the CPU 110 illustrated in FIG. 1.

The image storage unit 280 is configured to store the image file generated by the recording control unit 270. Note that the image storage unit 280 corresponds to the storage unit 170 illustrated in FIG. 1.

Figure 3:
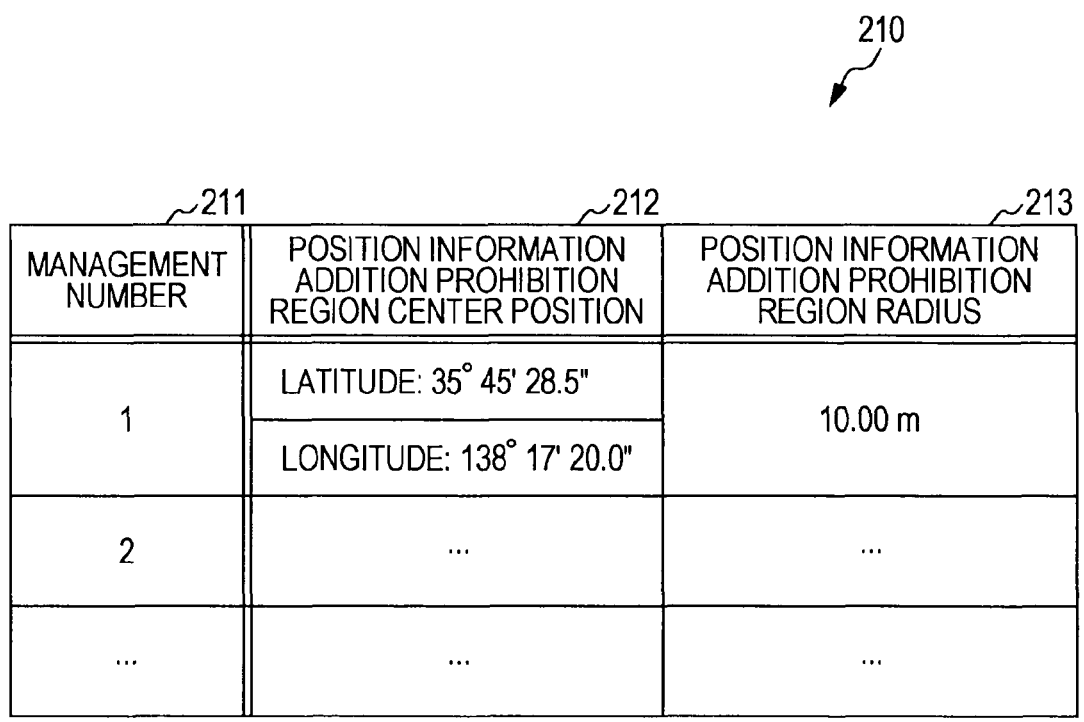
FIG. 3 is a diagram schematically illustrating details stored in a position information addition prohibition region storage unit 210 according to the embodiment of the present invention.

FIG. 3 is a diagram schematically illustrating details stored in the position information addition prohibition region storage unit 210 according to the embodiment of the present invention. In the position information addition prohibition region storage unit 210, a management number 211, a position information addition prohibition region center position 212, and a position information addition prohibition region radius 213 are stored. Note that, in the example illustrated in FIG. 3, the case where a region specified based on a circle is set as a position information addition prohibition region will be described.

The management number 211 is an identification number given to each of position information addition prohibition regions set by a user. For example, management numbers 1, 2, 3, . . . are stored in accordance with a set order.

The position information addition prohibition region center position 212 is data indicating the center position of a position information addition prohibition region set by a user. For example, the latitude and the longitude corresponding to the center position of a position information addition prohibition region are stored in association with a number in the management number 211.

The position information addition prohibition region radius 213 is data indicating the radius of a position information addition prohibition region set by a user. For example, a value in units of meter (m) is stored in association with a number in the management number 211. Note that these settings of a position information addition prohibition region will be described in detail with reference to FIG. 4.

Figure 4:
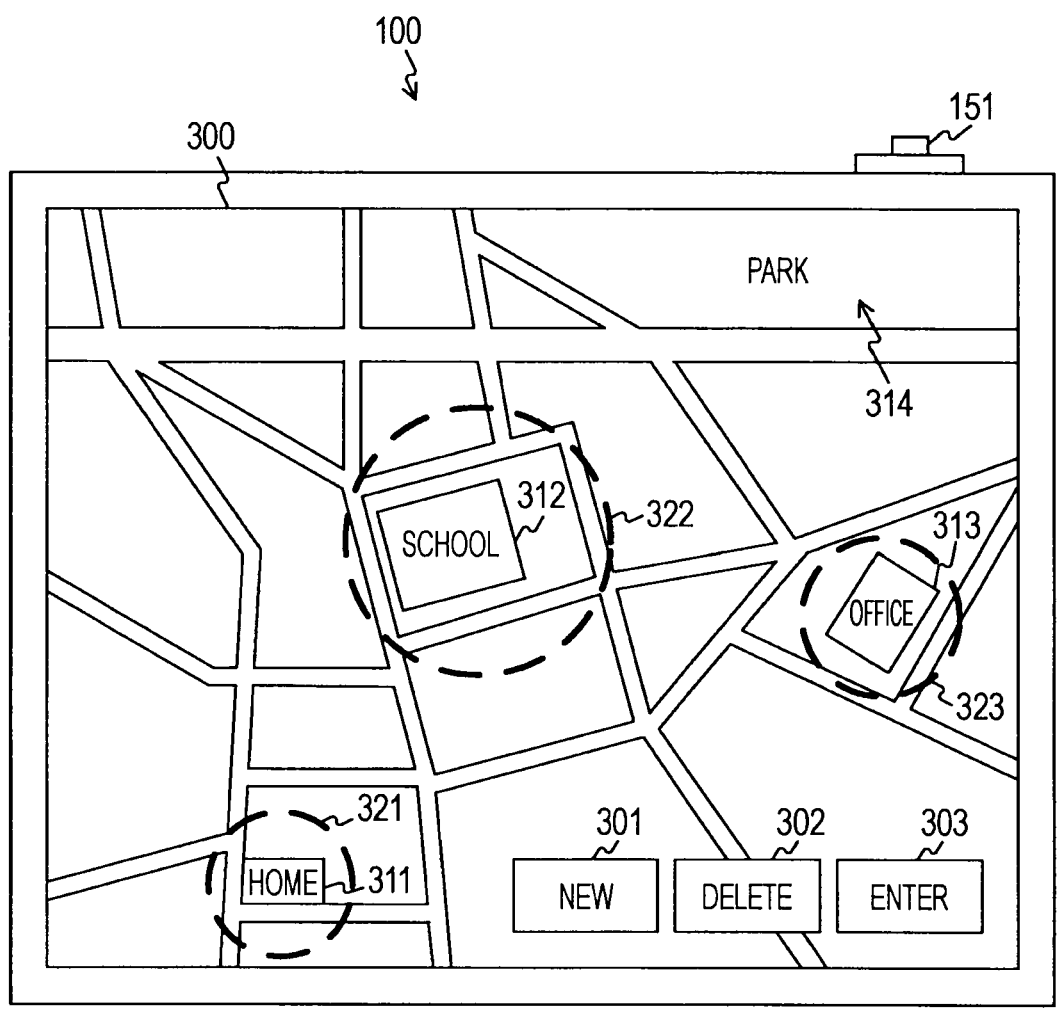
FIG. 4 is a diagram illustrating the overview of a setting method of setting a position information addition prohibition region on a liquid crystal panel 300 according to the embodiment present invention.

FIG. 4 is a diagram illustrating the overview of a setting method of setting a position information addition prohibition region on the liquid crystal panel 300 according to the embodiment of the present invention. In the case where a position information addition prohibition region is to be set in the liquid crystal panel 300, for example, an instruction operation for causing a position information addition prohibition region setting screen for setting a position information addition prohibition region to be displayed is performed on a menu screen (not illustrated) displayed on the liquid crystal panel 300. Upon this instruction operation, a designation operation that designates an area in which a position information addition prohibition region should be set is performed. For example, as illustrated in FIG. 4, in the case where a user's home 311 and office 313 and a child's school 312 are to be individually set as position information addition prohibition regions, an operation input for causing a position information addition prohibition region setting screen including a map that corresponds to an area where the home 311, the school 312, and the office 313 exist to be displayed on the liquid crystal panel 300 is performed. Note that map information for displaying the map included in the position information addition prohibition region setting screen can be stored in, for example, the RAM 130 and obtained from the RAM 130 in accordance with a user's designation operation. Also, the map information may be stored in a map information storage apparatus different from the image capturing apparatus 100, and the map information may be obtained from the map information storage apparatus via a network such as the Internet. Also, in the case where a position information addition prohibition region is to be set, the position information addition prohibition region may be set in an apparatus (personal computer or the like) different from the image capturing apparatus 100, and the stored details may be transferred to and stored in the image capturing apparatus 100.

On the position information addition prohibition region setting screen, a map of an area designated by the user is displayed, and a "new" button 301, a "delete" button 302, and an "enter" button 303 are displayed on the map. The "new" button 301 is a button to be pressed in the case where a position information addition prohibition region is to be newly added. The "delete" button 302 is a button to be pressed in the case where an already-stored position information addition prohibition region is to be deleted. The "enter" button 303 is a button to be pressed in the case where an operation of adding or deleting a position information addition prohibition region on the currently displayed map is to be entered.

Here, the case where the home 311 is to be set as a position information addition prohibition region on the position information addition prohibition region setting screen illustrated in FIG. 4 will be described. Firstly, the user presses the "new" button 301 displayed on the map and designates a circular region including the home 311 as a position information addition prohibition region. As this designation method, for example, a designation method of designating a position information addition prohibition region by drawing, by the user, with a finger, a circle corresponding to a region to be designated on the liquid crystal panel 300 may be used. Also, a designation method of designating a position information addition prohibition region by pressing, by the user, with a finger, the center position of a region to be designated on the liquid crystal panel 300 and sequentially enlarging the position information addition prohibition region in accordance with the number of times the center position is pressed may be used. Also, a designation method of designating, when the user presses, with a finger, two points serving as the diameter of a position information addition prohibition region on the liquid crystal panel 300, a circular area specified by the two points as a position information addition prohibition region may be used. The position information addition prohibition regions designated in such a manner are indicated by dotted lines as, for example, position information addition prohibition regions 321 to 323. Also, the center positions and radii of the position information addition prohibition regions designated in such a manner are stored in the position information addition prohibition region storage unit 210.

Here, in the case where a position information addition prohibition region stored in the position information addition prohibition region storage unit 210 is to be deleted, the user presses the "delete" button 302 displayed on the map, and the user designates a position information addition prohibition region to be deleted. As this designation method, for example, a designation method of designating a position information addition prohibition region to be deleted by touching, by the user, with a finger, any portion of the position information addition prohibition region to be deleted may be used. Also, in the case where such a new addition operation or a deletion operation is completed, the new addition operation or the deletion operation can be entered by pressing, by the user, the "enter" button 303.

Note that, as a position information addition prohibition region designation method, for example, the coordinate position on a map may be designated by inputting an address, and a position information addition prohibition region may be designated using the coordinate position.

Figure 5:
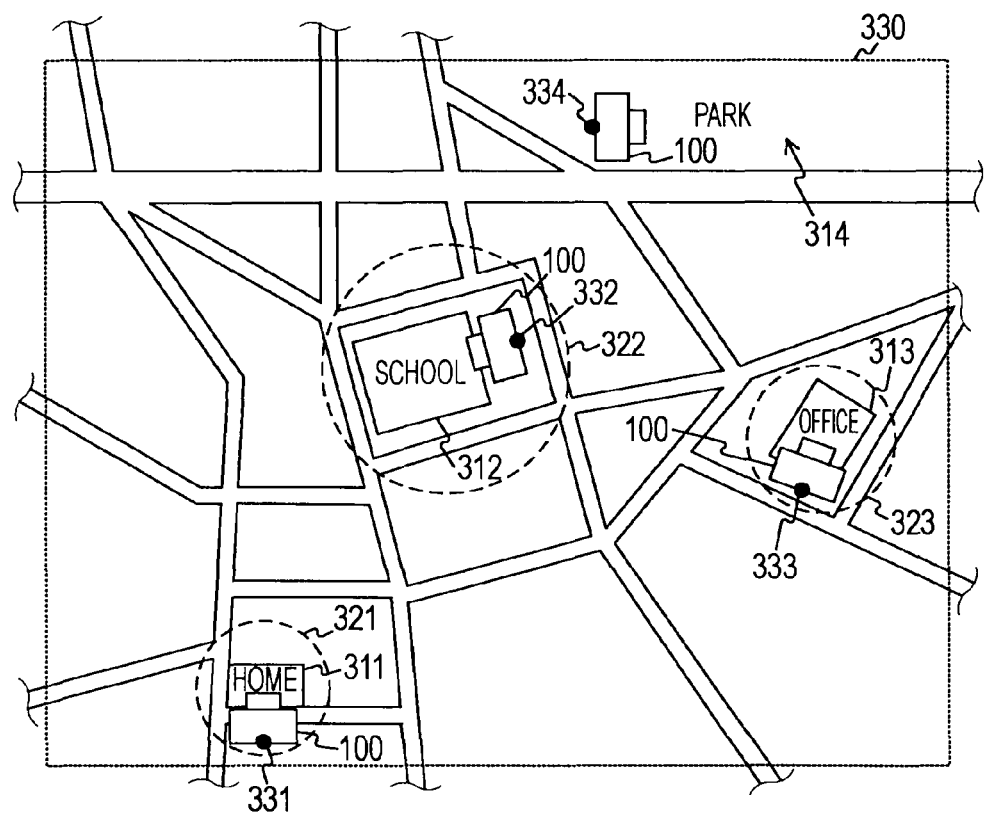
FIG. 5 is a top view illustrating the case where image capturing is performed using the image capturing apparatus 100 according to the embodiment of the present invention.

FIG. 5 is a top view illustrating the case where image capturing is performed using the image capturing apparatus 100 according to the embodiment of the present invention. In FIG. 5, the case where image capturing using the image capturing apparatus 100 is performed in an area corresponding to the map displayed on the liquid crystal panel 300 illustrated in FIG. 4 is schematically illustrated. Here, a range 330 illustrated in FIG. 5 is a range corresponding to the range of the map displayed on the liquid crystal panel 300 illustrated in FIG. 4 and is indicated as a dotted rectangle. For example, in the case where image capturing using the image capturing apparatus 100 is performed at positions 331 to 333 in the position information addition prohibition regions 321 to 323, items of position information in accordance with the image capturing places are not recorded in image files of captured images. In contrast, for example, as in a park 314, in the case where image capturing using the image capturing apparatus 100 is performed at a position 334 different from the position information addition prohibition regions 321 to 323, position information in accordance with the image capturing place is recorded in an image file of a captured image. Recording of the position information in the image file will be described in detail with reference to FIG. 6 and FIG. 7.

Figure 6:
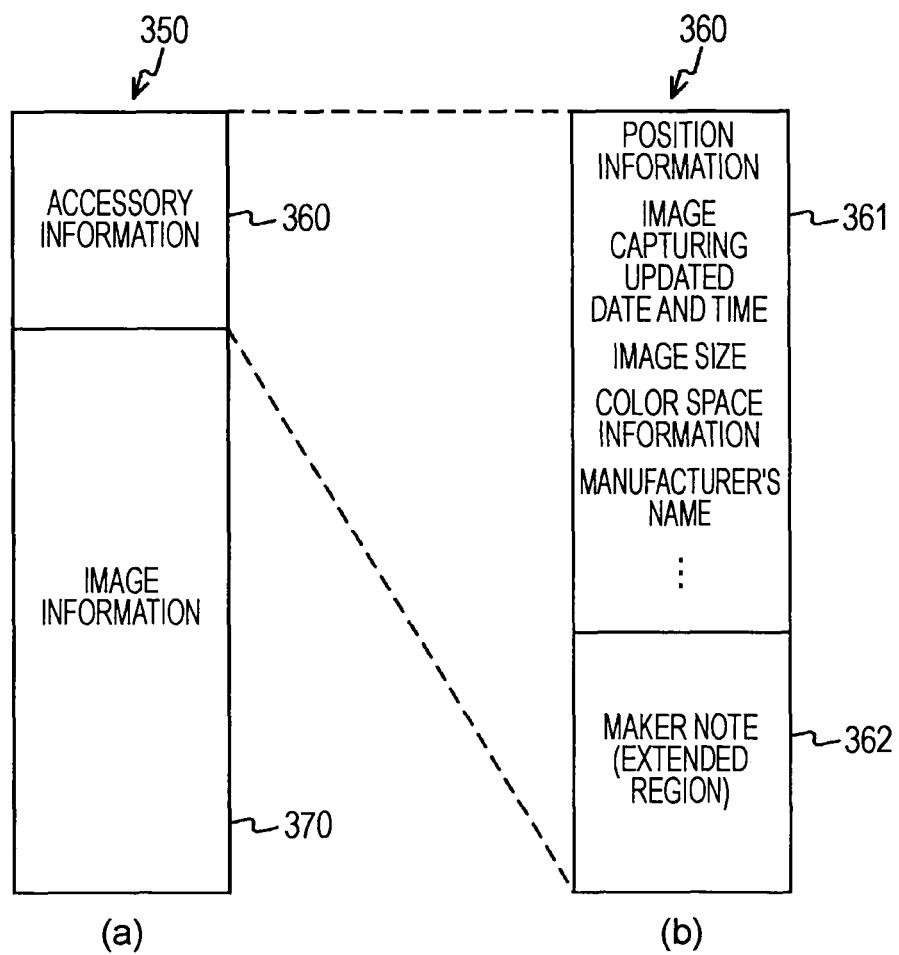
FIG. 6 includes diagrams illustrating an example of the file structure of an image file recorded using the image capturing apparatus 100 according to the embodiment of the present invention.

FIG. 6 includes diagrams illustrating an example of the file structure of an image file recorded using the image capturing apparatus 100 according to the embodiment of the present invention. In the example illustrated in FIG. 6, the file structure of a still image file recorded based on the DCF (Design rule for Camera File system) standard is schematically illustrated. DCF is a file system standard for realizing mutual utilization of an image via a recording medium between devices such as a digital still camera and a printer. In DCF, the naming of a file name and the folder structure in the case where recording on a recording medium is performed based on Exif (Exchangeable image file format) are defined. This Exif is a standard for adding image data and camera information into an image file and defines the format (file format) for recording the image file.

A still image file 350 is a still image file recorded based on the DCF standard and, as illustrated in (a) of FIG. 6, the still image file 350 is constituted of accessory information 360 and image information 370. The image information 370 is, for example, image data generated by the image capturing unit 250.

The accessory information 360 is constituted of, as illustrated in (b) of FIG. 6, attribute information 361 and a maker note 362. The attribute information 361 is attribute information or the like regarding the still image file 350 and includes, for example, position information (GPS information) such as the latitude, the longitude, and the altitude, image capturing updated date and time, image size, color space information, and manufacturer name. Note that, in the embodiment of the present invention, an example where position information is recorded in the attribute information 361 is illustrated.

The maker note 362 is generally a region where the user's unique data is recorded and is an extended region where each manufacturer can freely record information (TAGID=37500, MakerNote). Note that position information may be recorded in the maker note 362.

Figure 7:
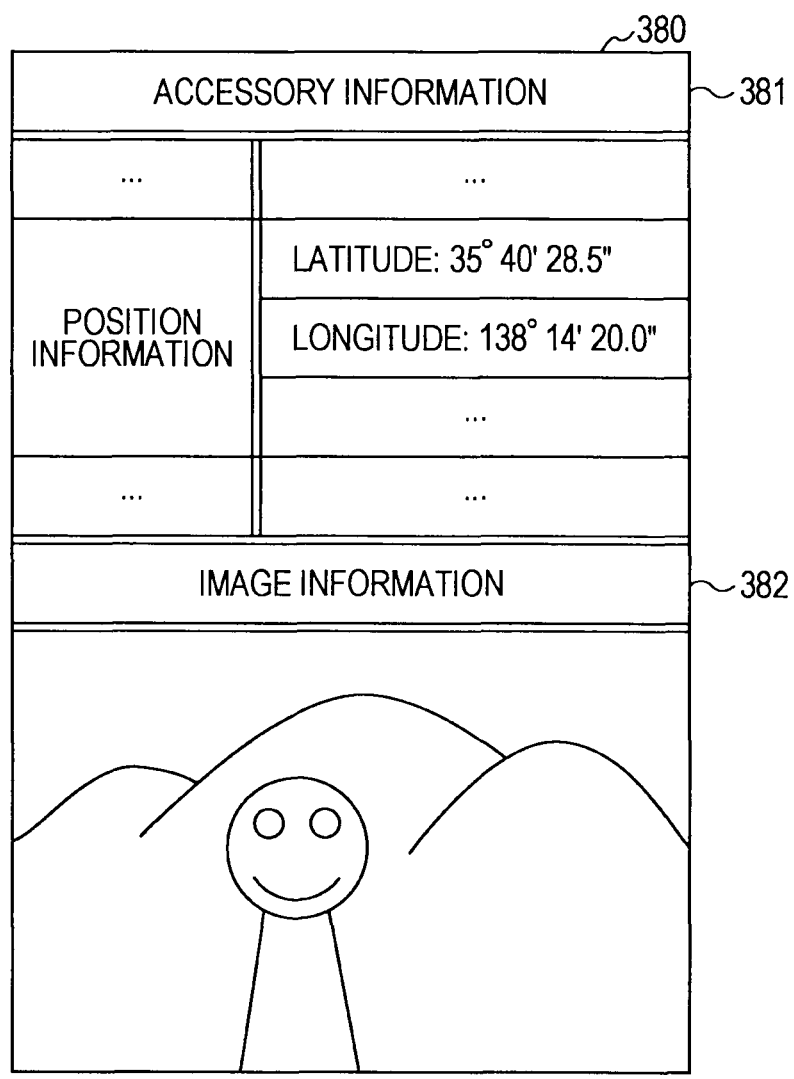
FIG. 7 is a diagram schematically illustrating an image file recorded using the image capturing apparatus 100 according to the embodiment of present invention.

FIG. 7 is a diagram schematically illustrating an image file recorded using the image capturing apparatus 100 according to the embodiment of the present invention. In FIG. 7, an image file 380 in the case where image capturing is performed at a place different from a position information addition prohibition region is illustrated. In this manner, in the case where image capturing is performed at a place different from a position information addition prohibition region, a captured image generated by the image capturing unit 250 is recorded in image information 382, and position information obtained by the position information obtaining unit 220 is recorded in accessory information 381. In contrast, in the case where image capturing is performed within a position information addition prohibition region, although a captured image generated by the image capturing unit 250 is recorded in the image information 382, position information obtained by the position information obtaining unit 220 is not recorded in the accessory information 381. Note that, in the example illustrated in FIG. 7, the case where the latitude and the longitude are recorded as position information in the image file is illustrated by way of example. Alternatively, other items of position information such as an address, the name of a place, and the name of an area may be recorded in the image file.

Next, the operation of the image capturing apparatus 100 according to the embodiment of the present invention will be described with reference to the drawings.

Figure 8:
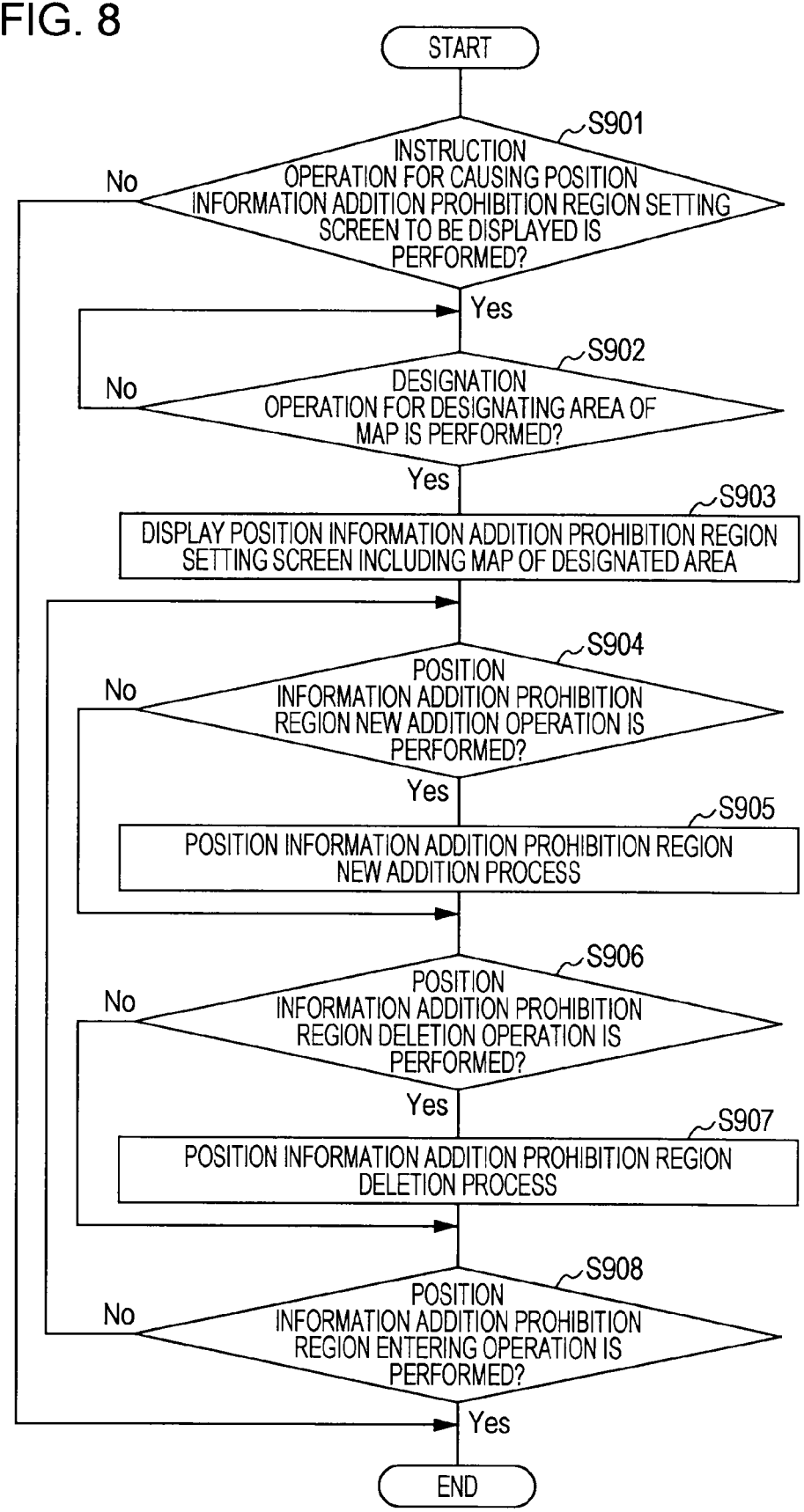
FIG. 8 is a flowchart illustrating the process steps of a position information addition prohibition region setting process using the image capturing apparatus 100 according to the embodiment of present invention.

FIG. 8 is a flowchart illustrating the process steps of a position information addition prohibition region setting process using the image capturing apparatus 100 according to the embodiment of the present invention.

At first, it is determined whether or not an instruction operation for causing a position information addition prohibition region setting screen to be displayed is performed on the liquid crystal panel 300 (step S901). In the case where no instruction operation for causing the position information addition prohibition region setting screen to be displayed is performed (step S901), the operation of the position information addition prohibition region setting process is terminated. In contrast, in the case where an operation input for causing the position information addition prohibition region setting screen to be displayed is performed (step S901), it is determined whether or not a designation operation for designating an area where a position information addition prohibition region should be set is performed on the liquid crystal panel 300 (step S902).

In the case where a designation operation for designating an area where a position information addition prohibition region should be set is performed (step S902), a position information addition prohibition region setting screen including a map of the designated area is displayed on the liquid crystal panel 300 (step S903). In the case where no designation operation for designating an area where a position information addition prohibition region should be set is performed (step S902), monitoring is performed until a designation operation is performed.

Then, it is determined whether or not a new addition operation is performed on the position information addition prohibition region setting screen displayed on the liquid crystal panel 300 (step S904). That is, it is determined whether or not the "new" button 301 is pressed on the position information addition prohibition region setting screen and a designation operation of a position information addition prohibition region is performed. In the case where a new addition operation is performed on the position information addition prohibition region setting screen (step S904), a position information addition prohibition region new addition process of adding the designated position information addition prohibition region as a new position information addition prohibition region is performed (step S905).

Then, it is determined whether or not a deletion operation is performed on the position information addition prohibition region setting screen displayed on the liquid crystal panel 300 (step S906). That is, it is determined whether or not the "delete" button 302 is pressed on the position information addition prohibition region setting screen and a designation operation of a position information addition prohibition region to be deleted is performed. In the case where a deletion operation is performed on the position information addition prohibition region setting screen (step S906), a position information addition prohibition region deletion process of deleting the designated position information addition prohibition region is performed (step S907).

Then, it is determined whether or not an enter operation is performed on the position information addition prohibition region setting screen displayed on the liquid crystal panel 300 (step S908). That is, it is determined whether or not the "enter" button 303 is pressed on the position information addition prohibition region setting screen. In the case where no enter operation is performed on the position information addition prohibition region setting screen (step S908), the flow returns to step S904, and a new addition process and a deletion process of a position information addition prohibition region are repeated (steps S904 to S907). In the case where an enter operation is performed on the position information addition prohibition region setting screen (step S908), the operation of the position information addition prohibition region setting process is terminated.

Figure 9:
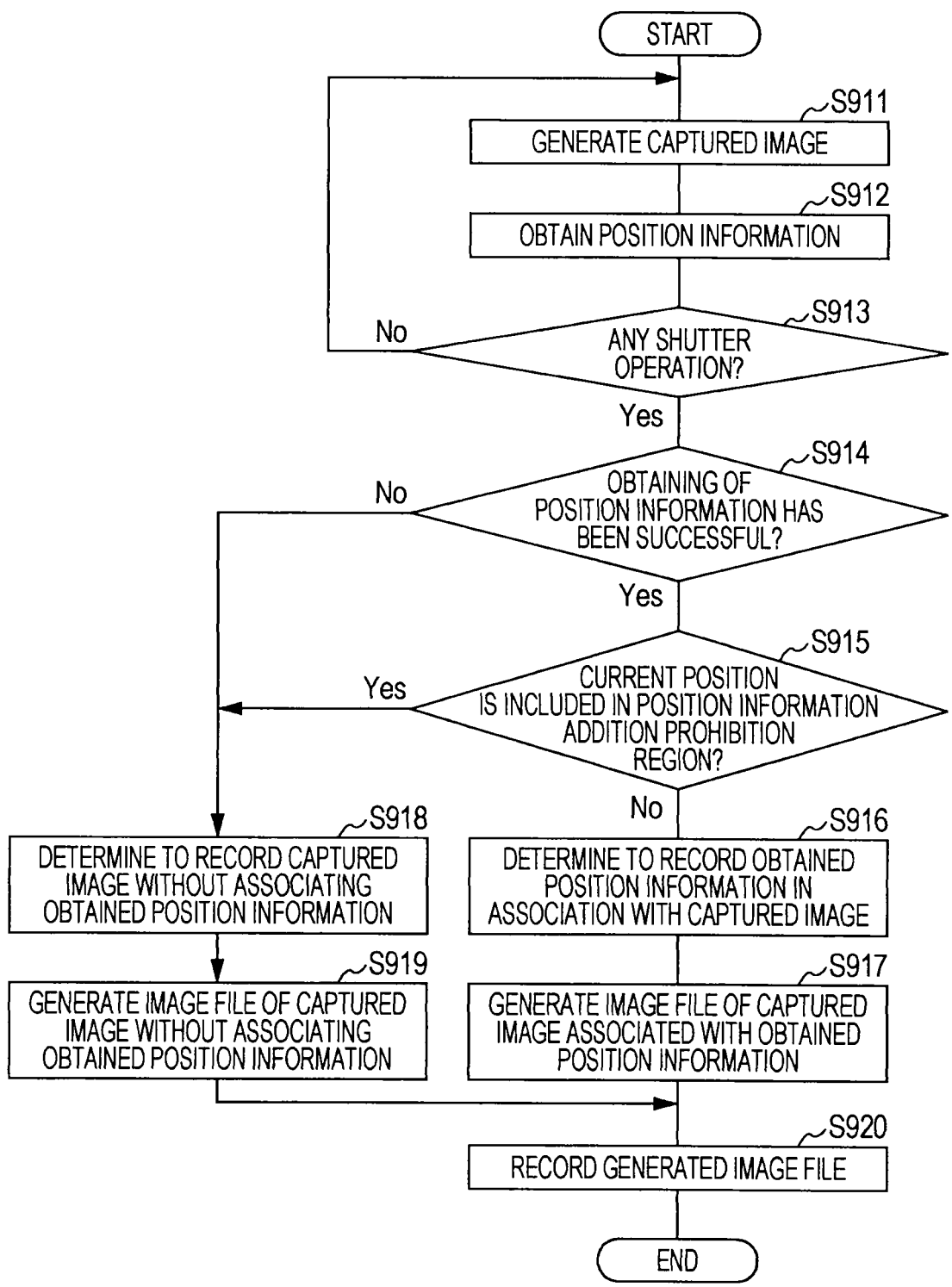
FIG. 9 is a flowchart illustrating the process steps of a captured image recording process using the image capturing apparatus 100 according to the embodiment the present invention.

FIG. 9 is a flowchart illustrating the process steps of a captured image recording process using the image capturing apparatus 100 according to the embodiment of the present invention.

At first, the image capturing unit 250 generates a captured image (step S911). Then, the position information obtaining unit 220 obtains position information (step S912). Then, it is determined whether or not a shutter operation is accepted by the shutter operation accepting unit 260 (step S913). In the case where no shutter operation is accepted (step S913), the flow returns to step S911. In contrast, in the case where a shutter operation is accepted (step S913), it is determined whether or not obtaining of position information by the position information obtaining unit 220 has been successful (step S914). In the case where it is determined that obtaining of position information has failed (step S914), the position information addition determining unit 240 determines to record the captured image without associating position information with the captured image (step S918). The recording control unit 270 generates an image file of the captured image without associating position information (step S919). In contrast, in the case where it is determined that obtaining of position information has been successful (step S914), the position information addition prohibition region determining unit 230 determines whether or not a position (current position) specified based on the obtained position information is included in any of position information addition prohibition regions stored in the position information addition prohibition region storage unit 210 (step S915). In the case where the current position is included in any of the position information addition prohibition regions (step S915), the flow proceeds to step S918. In contrast, in the case where the current position is included in none of the position information addition prohibition regions (step S915), the position information addition determining unit 240 determines to record the captured image in association with the position information (step S916). The recording control unit 270 generates an image file of the captured image associated with the obtained position information (step S917). Then, the recording control unit 270 records the generated image file in the image storage unit 280 (step S920).

In the above description, the example in which, in the case where a position information addition prohibition region is to be set, a map is displayed on the liquid crystal panel 300 and a user manually designates a circular position information addition prohibition region on the map has been described. However, a position information addition prohibition region may be set in units of areas such as in units of countries, in units of prefectures, or in units of municipalities. For example, there may be a user who does not wish to record, as position information, the user's image capturing activities in daily life in a country where the user lives. In the case where this user goes abroad, for example, it is anticipated that the user goes abroad on a trip or the like. Thus, it is anticipated that the user may wish to record position information as the trip's history information. In such a case, a setting operation may be made easier by designating a position information addition prohibition region in units of areas. Thus, hereinafter, a setting method of designating a position information addition prohibition region in units of prefectures, countries, or the like will be described in detail with reference to the drawings.

FIG. 10 includes diagrams illustrating the overview of a setting method of setting a position information addition prohibition region on the liquid crystal panel 300 according to the embodiment of the present invention. In (a) of FIG. 10, a display example in the case where a position information addition prohibition region is set in units of prefectures on the liquid crystal panel 300 is illustrated. In (b) of FIG. 10, a display example in the case where a position information addition prohibition region is set in units of countries on the liquid crystal panel 300 is illustrated.

For example, as illustrated in (a) of FIG. 10, in the case where a position information addition prohibition region is to be set in units of prefectures on the liquid crystal panel 300, prefecture selecting buttons 401 to 404 for selecting desired prefectures are displayed. Note that, although only four prefectures such as Tokyo are illustrated in the display example illustrated in (a) of FIG. 10, other prefecture selecting buttons can be displayed by pressing, for example, up and down scroll buttons 405 and 406. A position information addition prohibition region(s) can be set by pressing an "enter" button 407 after one or a plurality of prefecture selecting buttons are selected. Note that, when a "return" button 408 is pressed, another screen that was immediately previously displayed is displayed.

Also, a position information addition prohibition region setting screen illustrated in (b) of FIG. 10 is an example where, on a position information addition prohibition region setting screen illustrated in (a) of FIG. 10, country selecting buttons 411 to 414 are displayed instead of the prefecture selecting buttons 401 to 404. Note that, as in the position information addition prohibition region setting screen illustrated in (a) of FIG. 10, only four countries such as Japan are displayed in (b) of FIG. 10. However, other country selecting buttons can be displayed by pressing, for example, the up and down scroll buttons 405 and 406.

FIG. 11 includes diagrams schematically illustrating details stored in position information addition prohibition region storage units 420 and 430 according to the embodiment of the present invention. The position information addition prohibition region storage units 420 and 430 are modifications of the position information addition prohibition region storage unit 210 illustrated in FIG. 4. The position information addition prohibition region storage units 420 and 430 store, in position information addition prohibition regions 422 and 432, region information such as the latitude and the longitude for specifying the region of a prefecture or a country. That is, in (a) of FIG. 11, the position information addition prohibition region storage unit 420 used in the case where a position information addition prohibition region is set in units of prefectures on the position information addition prohibition region setting screen illustrated in (a) of FIG. 10 is illustrated. Also, in (b) of FIG. 11, the position information addition prohibition region storage unit 430 used in the case where a position information addition prohibition region is set in units of countries on the position information addition prohibition region setting screen illustrated in (b) of FIG. 10 is illustrated. Note that, in FIG. 11, region information stored in the position information addition prohibition regions 422 and 432 is omitted, and, instead of this region information, prefecture names or country names are illustrated.

Note that, in this example, the example where the country or prefecture selecting buttons are pressed has been described. Alternatively, for example, a map in units of countries, in units of prefectures, or the like may be displayed, and designation in units of countries or prefectures may be performed by pressing a desired area.

In the above description, the examples where it is determined whether or not to add position information depending on whether or not the current position of the image capturing apparatus 100 is included in a position information addition prohibition region have been described. However, even in the case where the current position of the image capturing apparatus is included in a position information addition prohibition region, for example, in the case where a captured image that is not likely to be transferred to another person and to be uploaded on a Web site is to be recorded, it is regarded that position information may be added. Thus, hereinafter, an example in which, in the case where the current position of the image capturing apparatus is included in a position information addition prohibition region, it is determined whether or not to add position information based on a certain condition will be described.

Figure 12:
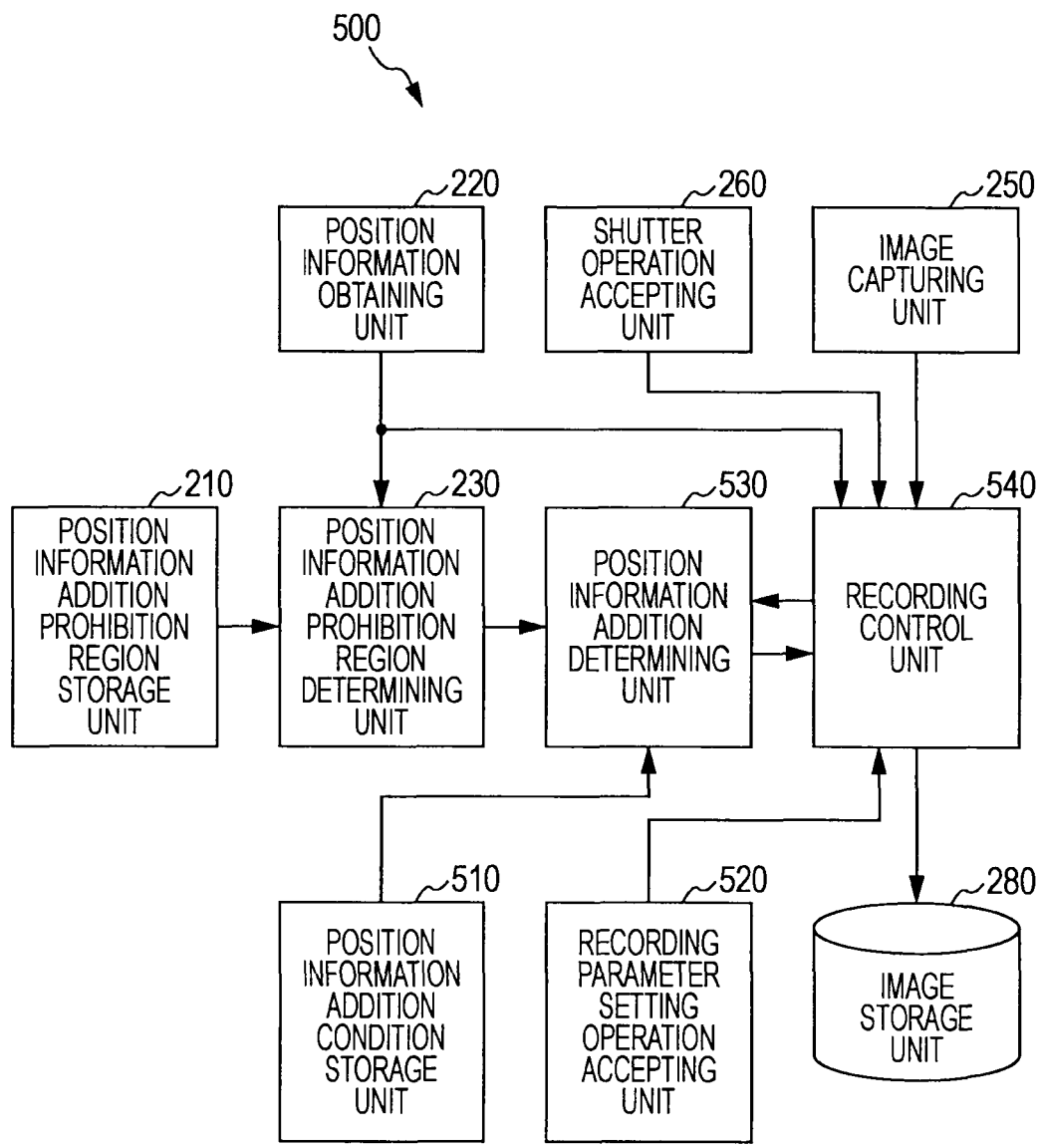
FIG. 12 is a block diagram illustrating an example of the functional configuration of an image capturing apparatus 500 according to an embodiment of the present invention.

FIG. 12 is a block diagram illustrating an example of the functional configuration of an image capturing apparatus 500 according to an embodiment of the present invention. Here, the image capturing apparatus 500 is obtained by modifying part of the image capturing apparatus 100 illustrated in FIG. 2 and is an image capturing apparatus in which, instead of the position information addition determining unit 240 and the recording control unit 270, a position information addition determining unit 530 and a recording control unit 540 are provided, and to which a position information addition condition storage unit 510 and a recording parameter setting operation accepting unit 520 are added. Therefore, a detailed description of the configuration similar to the image capturing apparatus 100 illustrated in FIG. 2 is omitted. Also, regarding the other configuration, points that are different from the image capturing apparatus 100 illustrated in FIG. 2 are mainly described. Note that, since the internal configuration of the image capturing apparatus 500 is the same as that illustrated in FIG. 1, a description thereof is omitted here.

The position information addition condition storage unit 510 is configured to store a position information addition condition in accordance with a recording parameter that can be set by a user, and the position information addition condition storage unit 510 supplies the stored position information addition condition to the position information addition determining unit 530. Note that the position information addition condition storage unit 510 corresponds to the RAM 130 illustrated in FIG. 1. Also, details stored in the position information addition condition storage unit 510 will be described in detail with reference to FIG. 13.

The recording parameter setting operation accepting unit 520 is an operation accepting unit that accepts a setting operation of setting a recording parameter of an image file, and the recording parameter setting operation accepting unit 520 outputs the accepted setting operation details to the recording control unit 540. For example, as a recording parameter, a recording format such as JPEG or GIF (Graphic Interchange Format), an image size, or the like is set. Note that the recording parameter setting operation accepting unit 520 corresponds to the operation accepting unit 150 illustrated in FIG. 1.

The position information addition determining unit 530 is configured to determine whether or not to record position information output from the position information obtaining unit 220 in association with a captured image generated by the image capturing unit 250, based on the determination result output from the position information addition prohibition region determining unit 230 and the recording parameter output from the recording control unit 540. The position information addition determining unit 530 sequentially outputs a determination result to the recording control unit 540. Specifically, in the case where a position (current position) specified based on position information output from the position information obtaining unit 220 is included in none of position information addition prohibition regions stored in the position information addition prohibition region storage unit 210, regardless of the details of the recording parameter, it is determined to record the captured image in association with the position information. In contrast, in the case where the current position is included in any of the position information addition prohibition regions, it is determined, in accordance with the details of the recording parameter, whether or not to record the captured image in association with the position information. Note that the determination in the case where the current position is included in any of the position information addition prohibition regions will be described in detail with reference to FIG. 13. Note that the position information addition determining unit 530 corresponds to the CPU 110 illustrated in FIG. 1.

The recording control unit 540 is configured to generate an image file of a captured image output from the image capturing unit 250 when a recording instruction is output from the shutter operation accepting unit 260, in accordance with a recording parameter corresponding to the details of a setting operation output from the recording parameter setting operation accepting unit 520. The recording control unit 540 performs control to record the image file in the image storage unit 280. Also, the recording control unit 540 outputs a recording parameter corresponding to the details of a setting operation output from the recording parameter setting operation accepting unit 520 to the position information addition determining unit 530. Also, at the time of generating an image file, the recording control unit 540 performs control to determine whether or not to record position information output from the position information obtaining unit 220 in the image file, based on the determination result output from the position information addition determining unit 530. Note that the recording control unit 540 corresponds to the CPU 110 illustrated in FIG. 1.

Figure 13:
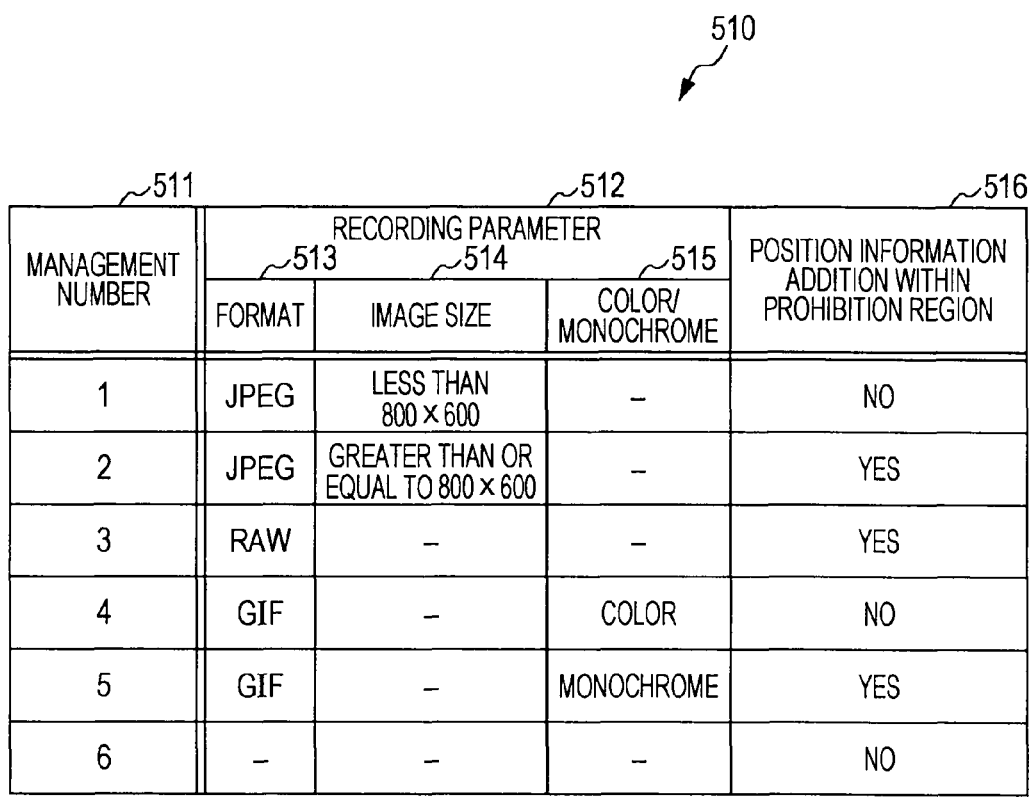
FIG. 13 is a diagram schematically illustrating details stored in a position information addition condition storage unit 510 according to the embodiment of the present invention.

FIG. 13 is a diagram schematically illustrating details stored in the position information addition condition storage unit 510 according to the embodiment of the present invention. In the position information addition condition storage unit 510, a management number 511, a recording parameter 512, and position information addition 516 within a position information addition prohibition region are stored.

The management number 511 is an identification number that identifies a position information addition condition in accordance with a recording parameter set by a user. For example, management numbers 1 to 6 are stored for individual position information addition conditions.

The recording parameter 512 is a recording parameter set by a user. A position information addition condition is set in accordance with recording parameters including a format 513, an image size 514, and color/monochrome 515. The format 513 is an image file recording system that can be set by a user. In FIG. 13, the case in which "JPEG", "RAW", and "GIF" can be set as settable image file recording systems is described by way of example. The image size 514 is an image size that can be set by a user. The color/monochrome 515 is "color" or "monochrome" that can be set by a user. Note that "-" in the recording parameter 512 means that all parameters match.

The position information addition 516 within a position information addition prohibition region is information indicating whether or not to add position information when any of position information addition conditions "1" to "6" of the management number 511 is satisfied. This information is indicated as "yes" or "no" in the example illustrated in FIG. 13.

Here, the relationship between the recording parameter 512 and the position information addition 516 within a position information addition prediction region will be described. For example, in the case where an image file in the JPEG format is to be uploaded to a Web site, the maximum image size is often defined. Therefore, an image file whose image size is relatively small may be uploaded to a Web site. Thus, in the example illustrated in FIG. 13, regarding an image file whose format 513 is "JPEG" and whose image size 514 is "less than 800×600", the position information addition 516 within a position information addition prohibition region is set to "no". In contrast, an image file whose image size is relatively large is highly likely not to be uploaded to a Web site and is highly likely to be used personally. Thus, regarding an image file whose format 513 is "JPEG" and whose image size 514 is "greater than or equal to 800×600", the position information addition 516 within a position information addition prohibition region is set to "yes".

Also, for example, an image file in the RAW format is highly likely not to be uploaded to a Web site and is highly likely to be used personally. Thus, regarding an image file whose format 513 is "RAW", the position information addition 516 within a position information addition prohibition region is set to "yes".

Also, for example, in the case where an image file in the GIF format is to be recorded in color, the image file may be uploaded to a Web site. Thus, in the example illustrated in FIG. 13, regarding an image file whose format 513 is "GIF" and whose color/monochrome 515 is "color", the position information addition 516 within a position information addition prohibition region is set to "no". In contrast, in the case where an image file in the GIF format is to be recorded in monochrome, the image file is more likely to be used personally than to be uploaded to a Web site. Thus, regarding an image file whose format 513 is "GIF" and whose color/monochrome 515 is "monochrome", the position information addition 516 within a position information addition prohibition region is set to "yes".

Also, in the case of an image file that matches none of the position information addition conditions "1" to "6" in the management number 511, the image file may be uploaded to a Web site. Thus, the position information addition 516 within a position information addition prohibition region of "6" in the management number 511 is set to "yes".

Note that the position information addition conditions illustrated in FIG. 13 are exemplary and may be changed, as occasion calls, in response to a user setting in accordance with the user's usage state, the probability of being uploaded to a Web site, or the like. Also, position information addition conditions may be set using other recording parameters. Also, position information addition conditions may be set using other elements different from recording parameters. Position information addition conditions may be set in accordance with other elements such as whether or not the current period of time is a day period of time or a night period of time.

Next, the operation of the image capturing apparatus 500 according to the embodiment of the present invention will be described with reference to the drawings.

Figure 14:
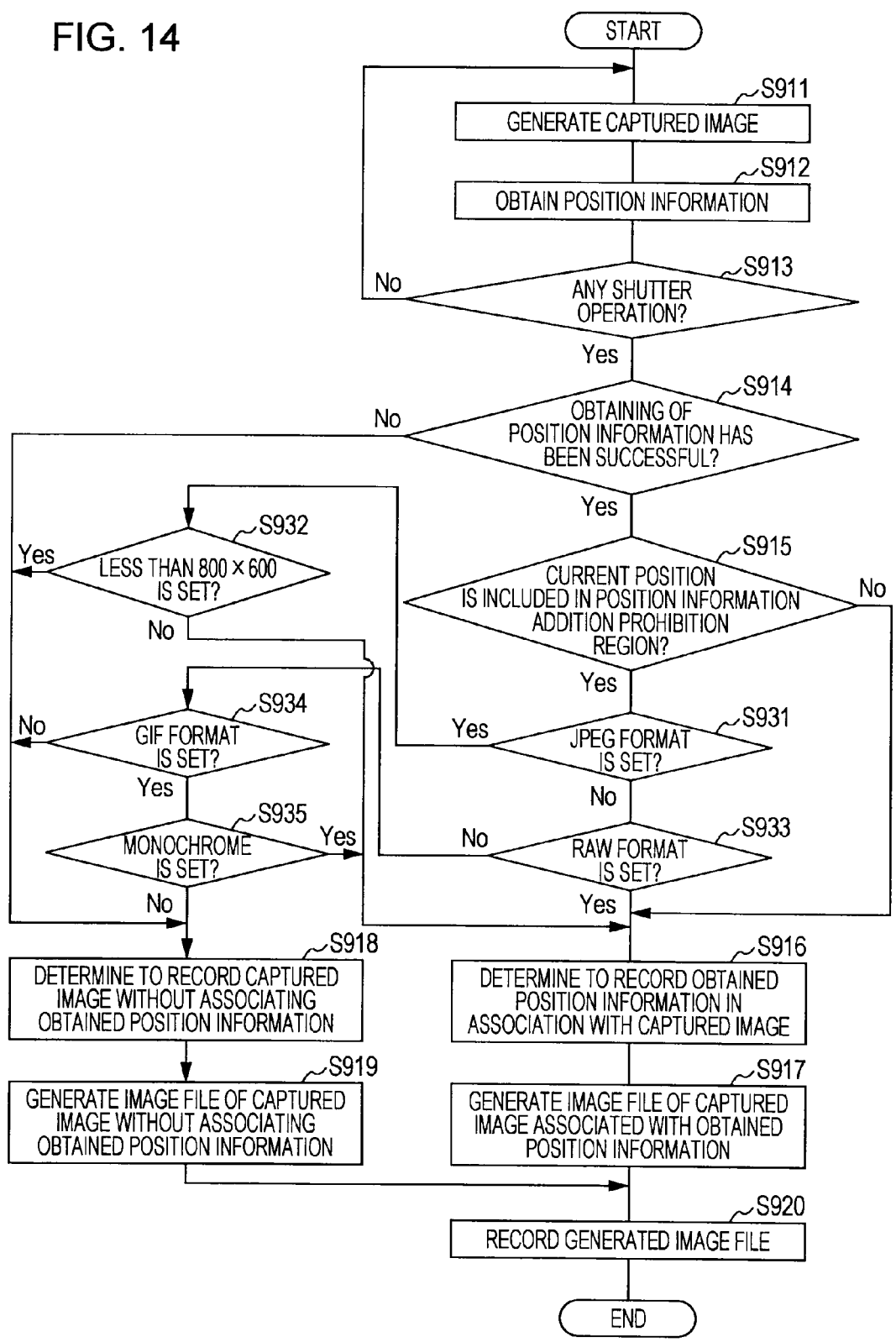
FIG. 14 is a flowchart illustrating the process steps of a captured image recording process using the image capturing apparatus 500 according to the embodiment of the present invention.

FIG. 14 is a flowchart illustrating the process steps of a captured image recording process using the image capturing apparatus 500 according to the embodiment of the present invention. Since the process steps are a modification of the process steps illustrated in FIG. 9 and are the same process steps as S911 to S915 and S916 to S920 illustrated in FIG. 9, a description thereof is omitted here.

In the case where the current position is included in any of position information addition prohibition regions stored in the position information addition prohibition region storage unit 210 (step S915), the position information addition determining unit 530 determines whether or not a recording parameter (the current recording parameter) set in the recording control unit 540 is the JPEG format (step S931). In the case where the current recording parameter is the JPEG format (step S931), the position information addition determining unit 530 determines whether or not the image size recorded in the JPEG format is less than 800 pixels×600 pixels (step S932). In the case where the image size recorded in the JPEG format is less than 800 pixels×600 pixels (step S932), the flow proceeds to step S918. In the case where the image size recorded in the JPEG format is greater than or equal to 800 pixels×600 pixels (step S932), the flow proceeds to step S916.

In the case where the current recording parameter is not the JPEG format (step S931), the position information addition determining unit 530 determines whether or not the current recording parameter is the RAW format (step S933). In the case where the current recording parameter is the RAW format (step S933), the flow proceeds to step S916. In contrast, in the case where the current recording parameter is not the RAW format (step S933), the position information addition determining unit 530 determines whether or not the current recording parameter is the GIF format (step S934). In the case where the current recording parameter is not the GIF format (step S934), the flow proceeds to step S918. In contrast, in the case where the current recording parameter is the GIF format (step S934), the position information addition determining unit 530 determines whether or not the current recording parameter is monochrome (step S935). In the case where the current recording parameter is monochrome (step S935), the flow proceeds to step S916. In the case where the current recording parameter is not monochrome (step S935), the flow proceeds to step S918.

The example in which one image file is recorded with one shutter operation has been described above. Here, in recent years, image capturing apparatuses that record two or more image files with one shutter operation have become widely spread. In the case where image capturing is performed using this image capturing apparatus, for captured images generated at the same time, a plurality of image files using different recording parameters are recorded. For example, an image file of a VGA image is recorded as a display image of the image capturing apparatus, and an image file in the JPEG format with an image size designated by a user is recorded. In this manner, in the case where two image files are recorded using different recording parameters, for example, one image file may be used only for management of the image capturing apparatus and may not be uploaded to a Web site. Also, the other image file may be highly likely to be uploaded to a Web site. In this manner, even a plurality of image files that are recorded for captured images generated at the same time may have different purposes of use. Thus, hereinafter, the case in which a plurality of image files are recorded for captured images generated at the same time will be described in detail with reference to the drawings.

Figure 15:
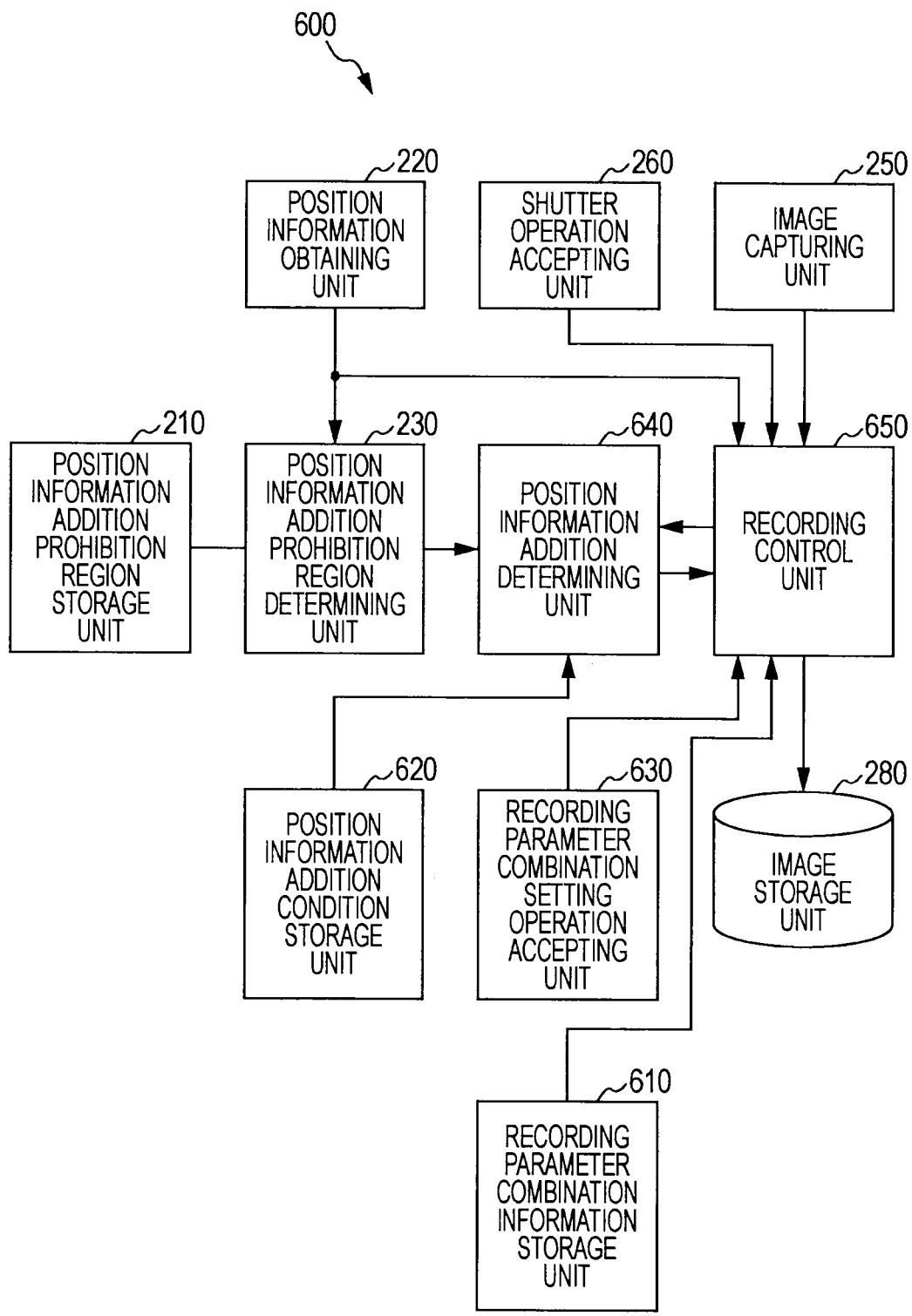
FIG. 15 is a block diagram illustrating an example of the functional configuration of an image capturing apparatus 600 according to an embodiment of the present invention.

FIG. 15 is a block diagram illustrating an example of the functional configuration of an image capturing apparatus 600 according to an embodiment of the present invention. Here, the image capturing apparatus 600 is obtained by modifying part of the image capturing apparatus 500 illustrated in FIG. 12 and is an image capturing apparatus in which, instead of the position information addition condition storage unit 510, the recording parameter setting operation accepting unit 520, the position information addition determining unit 530, and the recording control unit 540, a position information addition condition storage unit 620, a recording parameter combination setting operation accepting unit 630, a position information addition determining unit 640, and a recording control unit 650 are provided, and to which a recording parameter combination information storage unit 610 is added. Therefore, a detailed description of the configuration similar to the image capturing apparatus 500 illustrated in FIG. 12 is omitted. Also, regarding the other configuration, points that are different from the image capturing apparatus 500 illustrated in FIG. 12 are mainly described. Note that, since the internal configuration of the image capturing apparatus 600 is the same as that illustrated in FIG. 1, a description thereof is omitted here.

The recording parameter combination information storage unit 610 is configured to store a combination of recording parameters used at the time of recording a plurality of image files for captured images generated at the same time, and the recording parameter combination information storage unit 610 supplies the stored combination of recording parameters to the recording control unit 650. Note that the recording parameter combination information storage unit 610 corresponds to the RAM 130 illustrated in FIG. 1. Also, details stored in the recording parameter combination information storage unit 610 will be described in detail with reference to (a) of FIG. 16. Also, the recording parameter combination information storage unit 610 is an example of a recording parameter storage unit described in claims.

The position information addition condition storage unit 620 is configured to store a position information addition condition in accordance with a recording parameter that can be set by a user, and the position information addition condition storage unit 620 supplies the stored position information addition condition to the position information addition determining unit 640. Note that the position information addition condition storage unit 620 corresponds to the RAM 130 illustrated in FIG. 1. Also, details stored in the position information addition condition storage unit 620 will described in detail with reference to (b) of FIG. 16.

The recording parameter combination setting operation accepting unit 630 is an operation accepting unit that accepts a setting operation of setting a combination of recording parameters of image files, and the recording parameter combination setting operation accepting unit 630 outputs details of the accepted setting operation to the recording control unit 650. Note that a combination of recording parameters is selected from among combinations of recording parameters stored in the recording parameter combination information storage unit 610. Also, the recording parameter combination setting operation accepting unit 630 corresponds to the operation accepting unit 150 illustrated in FIG. 1.

The position information addition determining unit 640 is configured to determine whether or not to record position information output from the position information obtaining unit 220 in association with captured images generated by the image capturing unit 250, based on a determination result output from the position information addition prohibition region determining unit 230 and a plurality of recording parameters output from the recording control unit 650. The position information addition determining unit 640 sequentially outputs determination results to the recording control unit 650. Specifically, in the case where a position (current position) specified based on position information output from the position information obtaining unit 220 is included in none of position information addition prohibition regions stored in the position information addition prohibition region storage unit 210, regardless of the details of the recording parameters, it is determined to record the captured images in association with the position information. In contrast, in the case where the current position is included in any of position information addition prohibition regions, whether or not to record the captured images in association with the position information is determined for each recording parameter in accordance with the details of the plurality of recording parameters. Note that a determination in the case where the current position is included in any of position information addition prohibition regions will be described in detail with reference to FIG. 16. Note that the position information addition determining unit 640 corresponds to the CPU 110 illustrated in FIG. 1.

The recording control unit 650 is configured to generate image files of captured images output from the image capturing unit 250 at the time a recording instruction is output from the shutter operation accepting unit 260, in accordance with a combination of recording parameters corresponding to the details of a setting operation output from the recording parameter combination setting operation accepting unit 630. That is, a plurality of image files in accordance with a combination of recording parameters is generated, and these image files are sequentially recorded in the image storage unit 280. Also, the recording control unit 650 outputs, to the position information addition determining unit 640, a combination of recording parameters corresponding to the details of a setting operation output from the recording parameter combination setting operation accepting unit 630. Also, at the time of generating image files, the recording control unit 650 performs control, for each image file, to determine whether or not to record position information output from the position information obtaining unit 220 in the image files, based on a determination result output from the position information addition determining unit 640. Note that the recording control unit 650 corresponds to the CPU 110 illustrated in FIG. 1.

FIG. 16 includes diagrams schematically illustrating details stored in the recording parameter combination information storage unit 610 and the position information addition condition storage unit 620 according to the embodiment of the present invention. In the recording parameter combination information storage unit 610 illustrated in (a) of FIG. 16, a management number 611, a first image recording parameter 612, and a second image recording parameter 613 are stored. Here, in the example illustrated in (a) of FIG. 16, the case where, for captured images generated at the same time, two image files are recorded using different recording parameters with one shutter operation will be described by way of example. Also, combinations of two recording parameters at the time of recording two image files are stored in the recording parameter combination information storage unit 610, and a user sets a desired combination of recording parameters from among these combinations of recording parameters.

The management number 611 is an identification number that identifies a combination of recording parameters that can be set by a user. For example, management numbers 1, 2, 3, . . . are stored for individual combinations of recording parameters.

The first image recording parameter 612 is a first image recording parameter relating to a combination of recording parameters that can be set by a user. The second image recording parameter 613 is a second image recording parameter relating to a combination of recording parameters that can be set by a user. As combinations of recording parameters that can be set by a user, for example, a combination of "RAW" and "JPEG" and a combination of "designated number of pixels" and "VGA" are stored.

In the position information addition condition storage unit 620 illustrated in (b) of FIG. 16, a management number 621, a recording parameter 622, and position information addition 623 within a position information addition prohibition region are stored.

The management number 621 is an identification number that identifies a position information addition condition in accordance with a recording parameter that can be set by a user. For example, management numbers 1, 2, 3, . . . are stored for individual position information addition conditions.

The recording parameter 622 includes individual recording parameters relating to a combination of recording parameters that can be set by a user. These recording parameters are used as position information addition conditions.

The position information addition 623 within a position information addition prohibition region is information indicating whether or not to add position information at the time at which any of the recording parameters of the recording parameter 622 is satisfied. This information is indicated as "yes" or "no" in the example illustrated in (b) of FIG. 16.

Note that the combinations of recording parameters and the position information addition conditions illustrated in FIG. 16 are exemplary and may be changed, as occasion calls, in accordance with the user's usage state, the probability of being uploaded to a Web site, or the like. Also, position information addition conditions may be set using other recording parameters.

Next, the operation of the image capturing apparatus 600 according to the embodiment of the present invention will be described with reference to the drawings.

Figure 17:
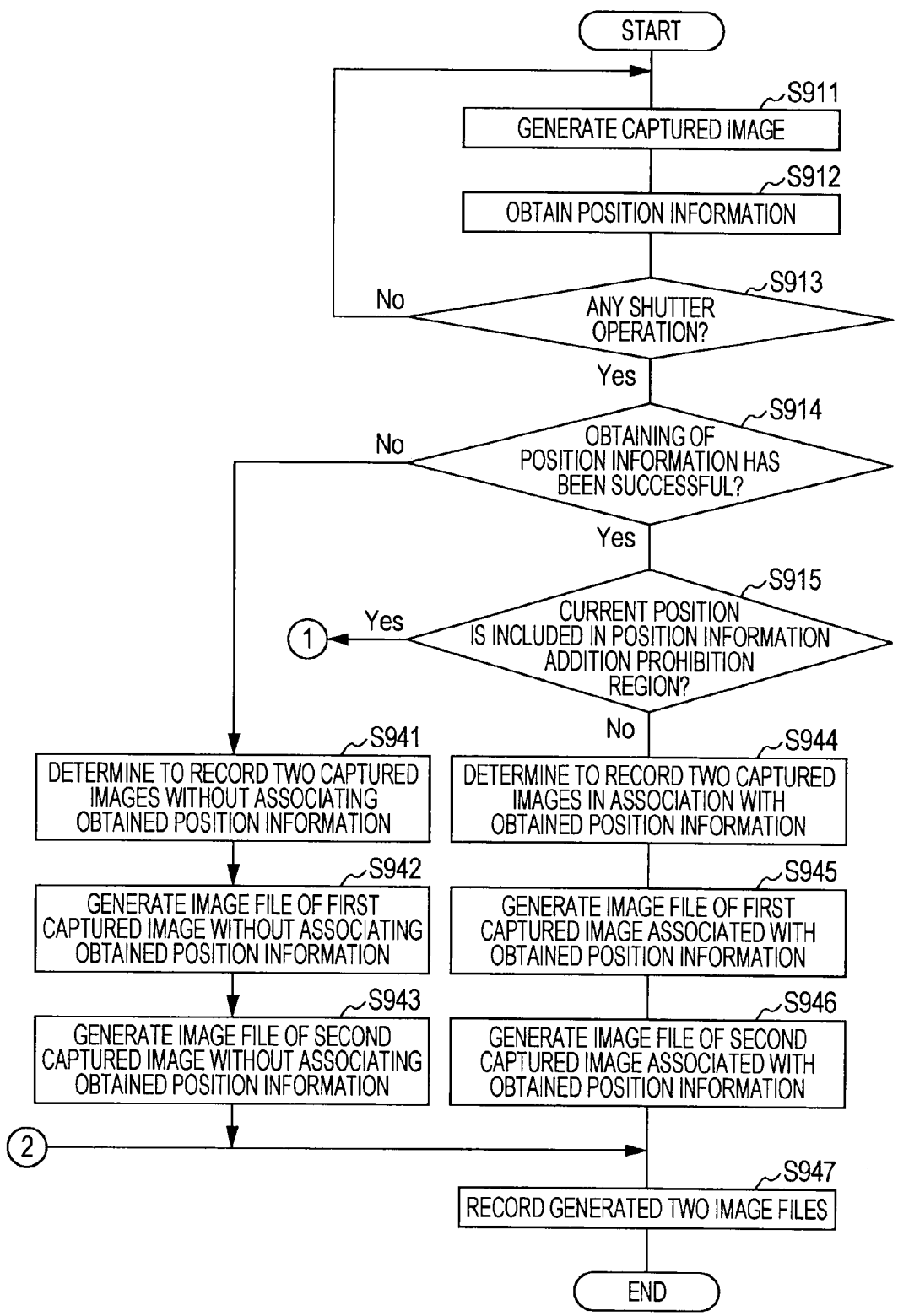
FIG. 17 is a flowchart illustrating the process steps of a captured image recording process using the image capturing apparatus 600 according to the embodiment of the present invention.
Figure 18:
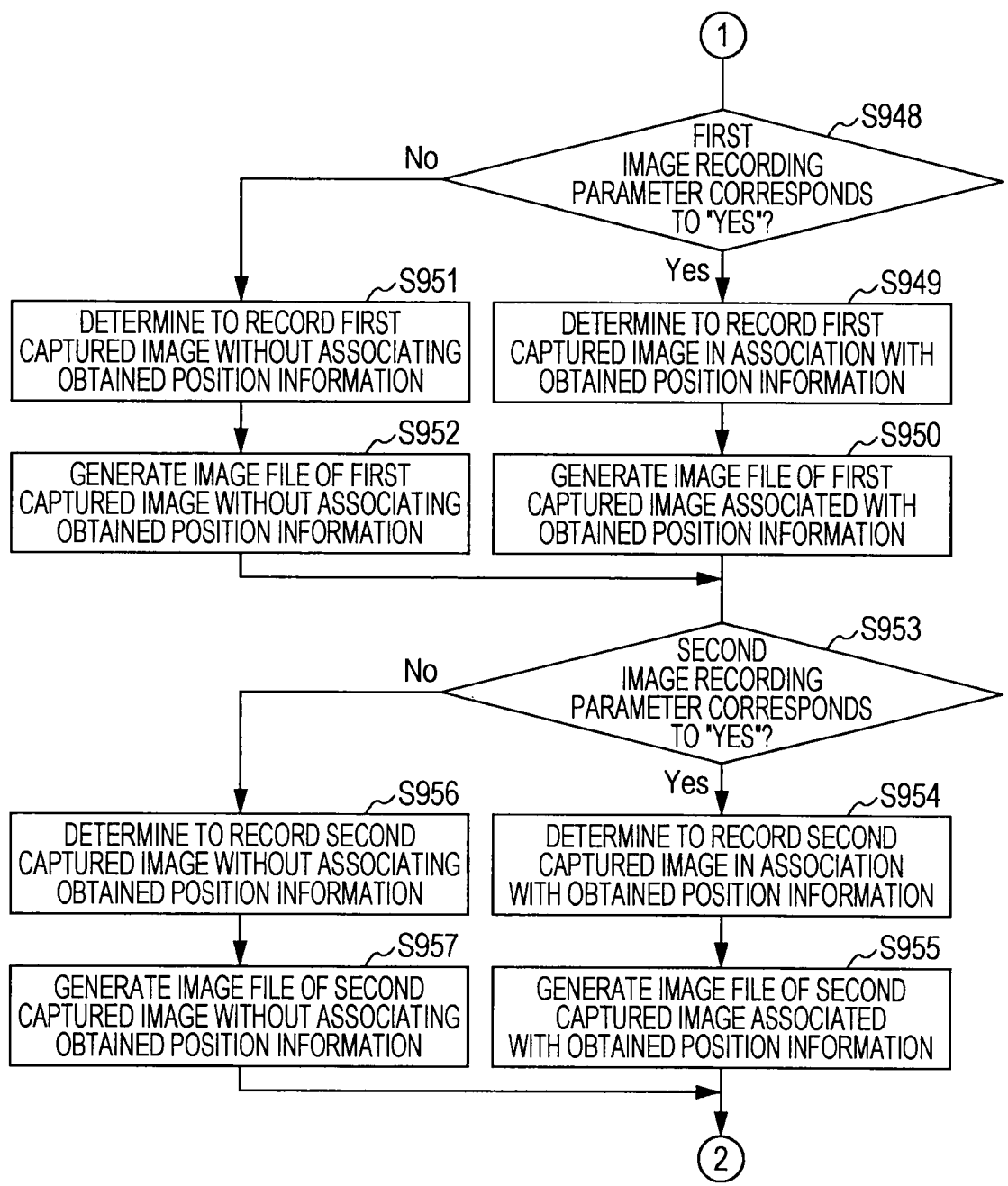
FIG. 18 is a flowchart illustrating the process steps of a captured image recording process using the image capturing apparatus 600 according to the embodiment of the present invention.

FIG. 17 and FIG. 18 are flowcharts illustrating the process steps of a captured image recording process using the image capturing apparatus 600 according to the embodiment of the present invention. Since the process steps are a modification of the process steps illustrated in FIG. 9, and steps S911 to S915 illustrated in FIG. 17 are the same process steps as S911 to S915 illustrated in FIG. 9, a description thereof is omitted here. Also, in this example, the example in which, for captured images generated at the same time, two image files are recorded in accordance with two recording parameters will be described.

In the case where it is determined that obtaining of position information by the position information obtaining unit 220 has failed (step S914), the position information addition determining unit 640 determines to record two image files without associating position information with captured images (step S941). The recording control unit 650 generates an image file of a captured image, without associating the obtained position information, in accordance with a first image recording parameter (step S942). Then, the recording control unit 650 generates an image file of a captured image, without associating the obtained position information, in accordance with a second image recording parameter (step S943). Then, the recording control unit 270 records the generated two image files in the image storage unit 280 (step S947).

Also, in the case where the current position is included in none of position information addition prohibition regions stored in the position information addition prohibition region storage unit 210 (step S915), the position information addition determining unit 640 determines to record two image files while associating position information with captured images (step S944). The recording control unit 650 generates an image file of a captured image associated with the obtained position information, in accordance with the first image recording parameter (step S945). Then, the recording control unit 650 generates an image file of a captured image associated with the obtained position information, in accordance with the second image recording parameter (step S946).

Also, in the case where the current position is included in any of the position information addition prohibition regions (step S915), the position information addition determining unit 640 determines whether or not the first image recording parameter corresponds to "yes" in the position information addition 623 within a position information addition prohibition region (step S948). In the case where the first image recording parameter corresponds to "yes" (step S948), the position information addition determining unit 640 determines to record an image file of the first image while associating the position information with the captured image (step S949). Then, the recording control unit 650 generates an image file of the captured image associated with the obtained position information, in accordance with the first image recording parameter (step S950). In contrast, in the case where the first image recording parameter corresponds to "no" (step S948), the position information addition determining unit 640 determines to record an image file of the first image without associating the position information with the captured image (step S951). Then, the recording control unit 650 generates an image file of the captured image, without associating the obtained position information, in accordance with the first image recording parameter (step S952).

Then, the position information addition determining unit 640 determines whether or not the second image recording parameter corresponds to "yes" in the position information addition 623 within a position information addition prohibition region (step S953). In the case where the second image recording parameter corresponds to "yes" (step S953), the position information addition determining unit 640 determines to record an image file of the second image while associating the position information with the captured image (step S954). Then, the recording control unit 650 generates an image file of the captured image associated with the obtained position information, in accordance with the second image recording parameter (step S955). In contrast, in the case where the second image recording parameter corresponds to "no" (step S953), the position information addition determining unit 640 determines to record an image file of the second image without associating the position information with the captured image (step S956). Then, the recording control unit 650 generates an image file of the captured image, without associating the obtained position information, in accordance with the second image recording parameter (step S957).

In this manner, in the case where, for captured images generated at the same time, a plurality of image files are to be recorded using different recording parameters, a position information addition determination in accordance with each recording condition can be performed. Accordingly, for example, in the case where an image file for a personal use and an image file for a public use that is to be made public to other people are to be recorded at the same time, a position information addition determination in accordance with the purpose of use can be performed on an image file by image file basis. Note that, since a database, a content management file for managing image files, and the like that are used only in the image capturing apparatus 600 are less likely to be made public to other people, it is preferable to record position information, regardless of whether or not to be recorded in an image file.

According to the embodiments of the present invention, as indicated above, for example, position information such as the position of a user's home that is undesired to be made public to other people can be prevented from being made public by mistake. Also, a position information addition prohibition region for determining whether or not to record such position information that is undesired to be made public can be easily designated.

Here, for example, in the case where a captured image is to be made public to other people, a captured image with a relatively small size is generally often used. Also, a RAW image is often used personally by a user. Thus, even in the case where the current position is included in a position information addition prohibition region, position information recording control in accordance with the image size, the recording format, or the like can be performed by performing a determination in accordance with the image size, the recording format, or the like. For example, position information is recorded in an image file of an original image or with a certain image size or greater, while position information is not recorded in an image file suitable for being sent via email or being uploaded to a Web site. Accordingly, position information can be recorded in an image file used personally, but position information is not recorded in an image file that may be made public to other people. That is, position information regarding personal information can be prevented from being revealed to other people at the time an image file is used.

Note that, although examples in which position information is computed based on a GPS signal are described in the embodiments of the present invention, position information may be obtained using another position information obtaining method. For example, position information may be derived using access point information based on a wireless LAN (Local Area Network) that exists in the surroundings, and this position information may be used.

Also, although the image capturing apparatuses such as digital cameras have been described by way of example in the embodiments of the present invention, the embodiments of the present invention are applicable to image capturing apparatuses such as a camcorder (camera and recorder), a cellular phone with an image capturing unit, and a device such as a PC (Personal Computer) with a camera function.

Also, although the image capturing apparatuses that record still images as content have been described by way of example in the embodiments of the present invention, the embodiments of the present invention are applicable to an information recording apparatus that generates and records content such as a moving image and audio. In the case where position information is to be recorded with a moving image, for example, position information can be recorded on a stream by stream basis. Also, position information may be recorded on a GOP (Group Of Picture) by GOP basis, or position information may be recorded at certain time intervals in a stream. In this case, as the information recording apparatus moves, a position information addition prohibition region determination and a position information addition determination are sequentially performed, and position information recording control is sequentially performed based on these determination results.

Also, although examples in which regions where position information is not to be recorded are designated as position information addition prohibition regions have been described in the embodiments of the present invention, for example, in the case where the number of regions where the user wishes to record position information is relatively small, regions where position information is to be recorded may be designated. In this case, regions other than the designated regions where position information is to be recorded can be regarded as position information addition prohibition regions.

Note that the embodiments of the present invention are illustrating examples for embodying the present invention, and, as described above, the embodiments of the present invention have correspondences with specific matters of the invention in claims. However, the present invention is not limited to these embodiments, and various modifications can be made without departing from the gist of the present invention.

Note that the process steps described in the embodiments of the present invention may be regarded as a method including these series of steps, or may be regarded as a program for causing a computer to execute these series of steps or a recording medium storing the program. As the recording medium, for example, a recording medium such as a CD (Compact Disc), an MD (MiniDisc), a DVD (Digital Versatile Disk), a memory card, a Blu-ray Disc (registered trademark) can be used.

The invention claimed is:

1. An information recording apparatus comprising:
    a memory that stores computer executable instructions; and
    a processor configured to execute the instructions in order to generate content,
        obtain position information at the time the content is generated,
        determine whether or not a position specified based on the obtained position information is included in a certain region,
        store a position information addition condition that indicates whether or not to allow the obtained position information to be recorded in association with the generated content based on recording parameters of the generated content, including at least one of format, size, and color, in the case where the position specified based on the obtained position information is included in the certain region,
        determine, based on a determination of whether or not a position specified based on the obtained position information is included in the certain region and based on the stored position information addition condition, whether or not to allow the obtained position information to be recorded in association with the generated content at the time the generated content is to be recorded, and
        perform, based on a determination of whether or not to allow the obtained position information to be recorded in association with the generated content, recording control of the obtained position information into the generated content.

2. The information recording apparatus according to claim 1, wherein the processor is configured to execute the instructions in order to
    store, as the position information addition condition, a plurality of the recording parameters at the time the generated content is to be recorded,
    accept a designation operation that designates at least one recording parameter from among the plurality of stored recording parameters,
    determine whether or not to allow the obtained position information to be recorded in association with the generated content at the time the generated content is to be recorded, based on the determination result of whether or not a position specified based on the obtained position information is included in the certain region and the designated recording parameter, and
    perform, based on a determination result of whether or not to allow the obtained position information to be recorded in association with the generated content, recording control of the obtained position information into the generated content, and allow the generated content to be recorded in accordance with the designated recording parameter.

3. The information recording apparatus according to claim 1, further comprising a recording parameter storage memory that stores a plurality of the recording parameters at the time the generated content is to be recorded,
    wherein the processor is configured to execute the instructions in order to
        determine, for each recording parameter, whether or not to allow the obtained position information to be recorded in association with the generated content at the time the generated content is to be recorded, based on the determination result of whether or not a position specified based on the obtained position information is included in the certain region and the plurality of recording parameters, and
        sequentially perform, for the plurality of recording parameters, recording control of the obtained position information into the generated content, based on a determination result, for each recording parameter, of whether or not to allow the obtained position information to be recorded in association with the generated content, and allow, for each recording parameter, the generated content to be sequentially recorded in accordance with the plurality of recording parameters.

4. The information recording apparatus according to claim 3, wherein the recording parameter storage memory stores a plurality of combinations of the recording parameters at the time the generated content is to be recorded,
    wherein the processor is configured to execute the instructions in order to
        accept a designation operation that designates at least one combination from among the plurality of combinations stored in the recording parameter storage unit memory,
        determine, for each of a plurality of recording parameters relating to the designated combination, whether or not to allow the obtained position information to be recorded in association with the generated content at the time the generated content is to be recorded, based on the determination result of whether or not a position specified based on the obtained position information is included in the certain region and the plurality of recording parameters relating to the designated combination, and
        sequentially perform, for each of the recording parameters relating to the designated combination, recording control of the obtained position information into the generated content, based on a determination result, for each of the plurality of recording parameters relating to the designated combination, of whether or not to allow the obtained position information to be recorded in association with the generated content, and allow, for each recording parameter, the generated content to be sequentially recorded in accordance with the plurality of recording parameters relating to the designated combination.

5. The information recording apparatus according to claim 1, wherein the processor is configured to execute the instructions in order to determine to allow the generated content to be recorded without associating the obtained position information with the content, in the case where the position specified based on the obtained position information is included in the certain region, and determine to allow the content to be recorded while associating the obtained position information with the content, in the case where the position specified based on the obtained position information is not included in the certain region.

6. The information recording apparatus according to claim 1, wherein the certain region is a region including a position regarding personal information.

7. The information recording apparatus according to claim 1, wherein the processor is configured to execute the instructions in order to accept a designation operation that designates a region on a map as the certain region.

8. An image capturing apparatus comprising:
a memory that stores computer executable instructions; and
a processor configured to execute the instructions in order to
capture an image of a photographic subject and generate a captured image,
obtain position information at the time the captured image is generated,
determine whether or not a position specified based on the obtained position information is included in a certain region,
store a position information addition condition that indicates whether or not to allow the obtained position information to be recorded in association with the generated captured image based on recording parameters of the generated captured image, including at least one of format, size, and color, in the case where the position specified based on the obtained position information is included in the certain region,
determine, based on a determination of whether or not a position specified based on the obtained position information is included in the certain region and based on the stored position information addition condition, whether or not to allow the obtained position information to be recorded in association with the generated captured image at the time the generated captured image is to be recorded, and
perform, based on a determination result of whether or not to allow the obtained position information to be recorded in association with the generated captured image, recording control of the obtained position information into the generated captured image.

9. An information recording method comprising:
generating content;
obtaining position information at the time the content is generated;
determining whether or not a position specified based on the obtained position information is included in a certain region;
storing a position information addition condition that indicates whether or not to allow the obtained position information to be recorded in association with the generated content based on recording parameters of the generated content, including at least one of format, size, and color, in the case where the position specified based on the obtained position information is included in the certain region;
determining, using a processor and based on a determination result obtained in the determining whether or not a position specified based on the obtained position information is included in a certain region, whether or not to allow the obtained position information to be recorded in association with the generated content at the time the generated content is to be recorded; and
performing, based on a determination result obtained in the determining whether or not to allow the obtained position information to be recorded in association with the generated content, recording control of the obtained position information into the generated content.

10. A non-transitory computer-readable storage medium storing computer-readable instructions thereon, which, when executed by a computer, cause the computer to perform an information recording method comprising:
generating content;
obtaining position information at the time the content is generated;
determining whether or not a position specified based on the obtained position information is included in a certain region;
storing a position information addition condition that indicates whether or not to allow the obtained position information to be recorded in association with the generated content based on recording parameters of the generated content, including at least one of format, size, and color, in the case where the position specified based on the obtained position information is included in the certain region;
determining, based on a determination result obtained in the determining whether or not a position specified based on the obtained position information is included in a certain region, whether or not to allow the obtained position information to be recorded in association with the generated content at the time the generated content is to be recorded; and
performing, based on a determination result obtained in the determining whether or not to allow the obtained position information to be recorded in association with the generated content, recording control of the obtained position information into the generated content.

* * * * *